(12) United States Patent
Overhultz et al.

(10) Patent No.: US 7,549,579 B2
(45) Date of Patent: *Jun. 23, 2009

(54) ADVERTISING COMPLIANCE MONITORING SYSTEM

(75) Inventors: Gary L. Overhultz, River Forest, IL (US); Gordon E. Hardman, Boulder, CO (US); Robert W. Mead, Chicago, IL (US)

(73) Assignee: Goliath Solutions, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,516

(22) Filed: Apr. 28, 2008

(65) Prior Publication Data

US 2008/0197193 A1 Aug. 21, 2008

Related U.S. Application Data

(60) Division of application No. 10/665,540, filed on Sep. 18, 2003, now Pat. No. 7,374,096, which is a continuation-in-part of application No. 10/393,330, filed on Mar. 20, 2003, now Pat. No. 6,951,305, which is a continuation-in-part of application No. 10/158,416, filed on May 30, 2002, now Pat. No. 6,837,427.

(60) Provisional application No. 60/332,149, filed on Nov. 21, 2001.

(51) Int. Cl.
*G06K 13/06* (2006.01)

(52) U.S. Cl. .................. 235/383; 235/385; 235/492

(58) Field of Classification Search .................. 235/487, 235/383, 385, 492
See application file for complete search history.

(56) References Cited

U.S. PATENT DOCUMENTS

| 5,168,263 A | 12/1992 | Drucker |
| 5,201,060 A | 4/1993 | Haruyama et al. |
| 5,235,326 A | 8/1993 | Beigel et al. |
| 5,252,979 A | 10/1993 | Nysen |
| 5,448,226 A | 9/1995 | Failing, Jr. et al. |
| 5,493,107 A | 2/1996 | Gupta et al. |
| 5,583,819 A | 12/1996 | Roesner et al. |

(Continued)

FOREIGN PATENT DOCUMENTS

CN 1270685 10/2000

(Continued)

OTHER PUBLICATIONS

Article, "Mobilocity Inc.", Issue No. 60, M-Business Insights, Aug. 9, 2001 (15 pp.).

(Continued)

*Primary Examiner*—Karl D. Frech
(74) *Attorney, Agent, or Firm*—Jones Day

(57) ABSTRACT

An advertising compliance monitoring system is provided that includes a backscatter tag affixed to a sign or marketing material or shopper ID card, the tag communicating with a backscatter reader. The tag includes a memory for storing tag data and a transmitter. The tag transmits tag data to a reader automatically on a periodic basis or when interrogated. The tag data includes an identification number used to identify the tag associated with a particular sign, price, marketing material or shopper. This data is processed by a computer to determine compliance with and/or exposure to a particular advertising program.

21 Claims, 14 Drawing Sheets

U.S. PATENT DOCUMENTS

| | | | |
|---|---|---|---|
| 5,583,850 | A | 12/1996 | Snodgrass et al. |
| 5,640,683 | A | 6/1997 | Evans et al. |
| 5,745,036 | A | 4/1998 | Clare |
| 5,771,005 | A | 6/1998 | Goodwin, III |
| 5,774,876 | A | 6/1998 | Woolley et al. |
| 5,776,278 | A | 7/1998 | Tuttle et al. |
| 5,793,029 | A | 8/1998 | Goodwin, III |
| 5,894,266 | A | 4/1999 | Wood, Jr. et al. |
| 5,910,776 | A | 6/1999 | Black |
| 5,920,261 | A | 7/1999 | Hughes et al. |
| 5,936,527 | A | 8/1999 | Isaacman et al. |
| 5,949,335 | A | 9/1999 | Maynard |
| 5,955,951 | A | 9/1999 | Wischerop et al. |
| 5,959,568 | A | 9/1999 | Woolley |
| 5,963,134 | A | 10/1999 | Bowers et al. |
| 5,964,656 | A | 10/1999 | Lawler, Jr. et al. |
| 5,966,696 | A | 10/1999 | Giraud et al. |
| 5,974,368 | A | 10/1999 | Schepps et al. |
| 6,002,344 | A | 12/1999 | Bandy et al. |
| 6,005,482 | A | 12/1999 | Moran et al. |
| 6,013,949 | A | 1/2000 | Tuttle |
| 6,025,780 | A | 2/2000 | Bowers et al. |
| 6,037,879 | A | 3/2000 | Tuttle |
| 6,043,746 | A | 3/2000 | Sorrells |
| 6,045,652 | A | 4/2000 | Tuttle et al. |
| 6,061,614 | A | 5/2000 | Carrender et al. |
| 6,070,156 | A | 5/2000 | Hartsell, Jr. |
| 6,078,888 | A | 6/2000 | Johnson, Jr. |
| 6,084,530 | A | 7/2000 | Pidwerbetsky et al. |
| 6,091,319 | A | 7/2000 | Black et al. |
| 6,097,292 | A | 8/2000 | Kelly et al. |
| 6,097,301 | A | 8/2000 | Tuttle |
| 6,100,790 | A | 8/2000 | Evans et al. |
| 6,104,279 | A | 8/2000 | Maletsky |
| 6,107,917 | A | 8/2000 | Carrender et al. |
| 6,109,568 | A | 8/2000 | Gilbert et al. |
| 6,121,878 | A | 9/2000 | Brady et al. |
| 6,121,880 | A | 9/2000 | Scott et al. |
| 6,127,917 | A | 10/2000 | Tuttle |
| 6,127,928 | A | 10/2000 | Issacman et al. |
| 6,133,836 | A | 10/2000 | Smith |
| 6,137,403 | A | 10/2000 | Desrochers et al. |
| 6,148,291 | A | 11/2000 | Radican |
| 6,150,921 | A | 11/2000 | Werb et al. |
| 6,150,934 | A | 11/2000 | Stiglic |
| 6,150,948 | A | 11/2000 | Watkins |
| 6,169,483 | B1 | 1/2001 | Ghaffari et al. |
| 6,177,861 | B1 | 1/2001 | MacLellan et al. |
| 6,195,005 | B1 | 2/2001 | Maloney |
| 6,195,006 | B1 | 2/2001 | Bowers et al. |
| 6,198,392 | B1 | 3/2001 | Hahn et al. |
| 6,204,764 | B1 | 3/2001 | Maloney |
| 6,212,401 | B1 | 4/2001 | Ackley |
| 6,215,403 | B1 | 4/2001 | Chan et al. |
| 6,220,516 | B1 | 4/2001 | Tuttle et al. |
| 6,229,445 | B1 | 5/2001 | Wack |
| 6,232,870 | B1 | 5/2001 | Garber et al. |
| 6,236,315 | B1 | 5/2001 | Helms et al. |
| 6,246,882 | B1 | 6/2001 | Lachance |
| 6,249,227 | B1 | 6/2001 | Brady et al. |
| 6,253,190 | B1 | 6/2001 | Sutherland |
| 6,260,049 | B1 | 7/2001 | Fitzgerald et al. |
| 6,262,662 | B1 | 7/2001 | Back et al. |
| 6,265,962 | B1 | 7/2001 | Black et al. |
| 6,265,963 | B1 | 7/2001 | Wood, Jr. |
| 6,269,342 | B1 | 7/2001 | Brick et al. |
| 6,272,457 | B1 | 8/2001 | Ford et al. |
| 6,294,999 | B1 | 9/2001 | Fletcher et al. |
| 6,298,591 | B1 | 10/2001 | Healy |
| 6,304,856 | B1 | 10/2001 | Soga et al. |
| 6,308,177 | B1 | 10/2001 | Israni et al. |
| 6,308,446 | B1 | 10/2001 | Healy |
| 6,312,106 | B1 | 11/2001 | Walker |
| 6,369,712 | B2 | 4/2002 | Letkomiller et al. |
| 6,405,102 | B1 | 6/2002 | Swartz et al. |
| 6,577,238 | B1 | 6/2003 | Whitesmith et al. |
| 6,580,358 | B1 | 6/2003 | Nysen |
| 6,650,230 | B1 | 11/2003 | Evans et al. |
| 6,715,675 | B1 | 4/2004 | Rosenfeld |
| 6,837,427 | B2 | 1/2005 | Overhultz et al. |
| 6,951,305 | B2 | 10/2005 | Overhultz et al. |
| 2001/0000430 | A1 | 4/2001 | Smith et al. |
| 2001/0001553 | A1 | 5/2001 | Hahn et al. |
| 2001/0004236 | A1 | 6/2001 | Letkomiller et al. |
| 2001/0054959 | A1 | 12/2001 | Horn et al. |
| 2002/0140546 | A1 | 10/2002 | Tuttle |
| 2002/0143668 | A1 | 10/2002 | Goodwin, III |
| 2002/0149468 | A1 | 10/2002 | Carrender et al. |
| 2002/0149480 | A1 | 10/2002 | Shanks et al. |
| 2002/0149481 | A1 | 10/2002 | Shanks et al. |
| 2002/0149482 | A1 | 10/2002 | Shanks et al. |
| 2002/0149483 | A1 | 10/2002 | Shanks et al. |
| 2003/0097302 | A1 | 5/2003 | Overhultz et al. |

FOREIGN PATENT DOCUMENTS

| | | |
|---|---|---|
| EP | 1197905 | 4/2002 |
| GB | 2375407 | 11/2002 |
| JP | 2003-43930 | 2/2003 |
| JP | 2003-61131 | 2/2003 |
| WO | 9904374 | 1/1999 |
| WO | 02084328 | 10/2002 |

OTHER PUBLICATIONS

Article, "What will they think of next?", http://www.frontlinetoday.com, Nov. 11, 2001 (4 pp.).

Article, "Find your stuff", http://www.frontlinetoday.com, Nov. 11, 2001 (4 pp.).

Article, "Getting organized on RFID", http://www.frontlinetoday.com, Nov. 11, 2001 (2 pp.).

Article, "Top 100 Companies: #10 Printronix", http://www.frontlinetoday.com, Nov. 11, 2001 (2 pp.).

Article, "Top 100 Companies: #9 PeopleSoft/Vantive", http://www.frontlinetoday.com, Nov. 11, 2001 (2 pp.).

Article, "Top 100 Companies: :#8 Hand Held Products, A Welch Allyn Affiliate", http://www.frontlinetoday.com, Nov. 11, 2001 (2 pp.).

Article, Top 100 Companies: #7 PSC, http://www.frontlinetoday.com, Nov. 11, 2001 (2 pp.).

Article, Top 100 Companies: #6 Texas Instruments, http://www.frontlinetoday.com, Nov. 11, 2001 (2 pp.).

Article, Top 100 Companies: #5Lucent Technologies, Agere Systems, http://www.frontlinetoday.com, Nov. 11, 2001 (2 pp.).

Article, Top 100 Companies: #4 Intermec, http://www.frontlinetoday.com, Nov. 11, 2001 (2 pp.).

Article, Top 100 Companies: #2 Zebra Technologies, http://www.frontlinetoday.com, Nov. 11, 2001 (2 pp.).

Article, Top 100 Companies: #1 Symbol Technologies, http://www.frontlinetoday.com, Nov. 11, 2001 (2 pp.).

Article, http://www.emetro.ca/Computers/Software/Bar_Code/, Nov. 11, 2001 (6 pp.).

Article, http://www.webcrawler.com/business/supplies_and_services/bar_codes/general_suppliers/, Nov. 11, 2001 (4 pp.).

Article, http://www.iop.co.uk/pakex2001.htm, Nov. 11, 2001 (8 pp.).

Article, http://www.emetro.ca/Computers/Software/Bar_Code/, Nov. 11, 2001 (16 pp.).

Article, Frontline Solutions Website, May 2001 (4 pp.).

Article, Speeding Through Store Checkout Lines, May 16, 2001 (2 pp.).

Article, (BW) (NJ-Checkpoint-Systems) (CKP) Checkpoint Systems Brings RFID Technology to Access Control Market With New Line of Readers and Cards, Oct. 1, 2001 (2 pp.).

Article, Logistics: The No-Gap Procurement Process, Nov. 11, 2001, pp. 44-45.

Press Release from Transponder News, "Motorola announces BiStatix 125KHz RFID tag", Mar. 2, 1999 (2 pp.).

Press Release from Transponder News, "RFID and home delivery boxes could revolutionize home laundry", May 2, 2000 (2 pp.).

ADVERTISING COMPLIANCE MONITORING SYSTEM

CROSS-REFERENCE TO RELATED APPLICATIONS

This application is a divisional of U.S. patent application Ser. No. 10/665,540, filed on Sep. 18, 2003 now U.S. Pat. No. 7,374,096, which claims the benefit of U.S. Provisional Application Ser. No. 60/332,149, filed on Nov. 21, 2001, and is a continuation-in-part of U.S. application Ser. No. 10/393,330, filed on Mar. 20, 2003 now U.S. Pat. No. 6,951,305, and entitled "Improved Advertising Compliance Monitoring System," which is a continuation-in-part of U.S. application Ser. No. 10/158,416 filed on May 30, 2002 now U.S. Pat. No. 6,837,427, and entitled "Advertising Compliance Monitoring System," which are all assigned to the assignee of the present application. The subject matter of the above applications is incorporated herein by reference in its entirety.

FIELD

The technology described in this application relates to an improved system and method of monitoring compliance with a Point of Purchase (POP) advertising program that displays one or more advertising signs or marketing materials, and more particularly to the monitoring of and exposure to advertising signs or marketing materials displayed at gas stations, convenience stores, grocery stores, mass merchandising outlets, drug stores, specialty retail outlets (e.g., pet stores, record stores, book stores), consumer electronics stores, etc.

BACKGROUND

It is desirable to monitor retailer compliance with advertising programs. Advertising that is not displayed has no value to a company. However, non-compliance with an advertising program is difficult to detect in a timely manner.

In the past, the primary way to collect information about whether retail outlets were complying with an advertising program was to rely on site surveys. These surveys were typically performed by manufacturer sales representatives, store delivery personnel, or independent survey companies. However, site surveys are generally expensive, incomplete, and untimely.

The direct costs associated with site surveys are substantial. Independent survey companies charge significant fees for travel time, as well as for data collection/tabulation. Consequently, information is typically available for only a subset or sample of the thousands or tens-of-thousands of stores targeted for a particular advertising program.

To save money, some companies request that delivery personnel and/or sales representatives compile compliance information while they are at a retail store for other purposes. The diversion of these personnel from doing their ordinary tasks (such as restocking or selling) can be substantial. Moreover, these personnel have little compliance training or Quality Assurance skills to ensure reporting consistency or accuracy. In addition, such visits are not of sufficient frequency to ascertain exactly when compliance with a particular advertising program began or ended.

Furthermore, compliance survey reports (whether by professionals or company personnel) usually lag the survey date. This delay prevents a timely rectification for non-complying stores. In particular, if an advertising program is designed to run for two weeks, it is important to know within a day of when the program was supposed to start which retail sites are out of compliance so the sites can be made compliant in a timely manner. The size of the staff and expense required to visit all advertising sites within 48 hours is prohibitive. Therefore, surveys or visits to a subset of sites are the only practical way to monitor compliance. However, for the reasons stated above, surveys are only sufficient for general or strategic conclusions, and are incapable of improving tactical POP compliance in a timely manner. Visits to a subset of sites do not yield sufficient information for full-compliance advertising goals.

Companies, such as petroleum companies and consumer packaged goods companies, spend millions of dollars to run a given POP program. Retail performance varies greatly. However, it is common for more than 50% of retail sites, presumed to be participating, to be out of compliance. The system described herein provides an efficient system for quickly identifying every non-complying site by using tags (e.g., wireless RFID tags) on each advertising sign or marketing material. The system also provides companies with information about when a POP program is running, what advertising is and is not being displayed, and when new signs will be produced and shipped to retail outlets. The system can monitor other merchandizing conditions besides signage, such as the presence or absence of display racks or containers, the presence of promotional hardware, or the presence of certain items to be sold under certain conditions. The system can be expanded to report when the amount of product on a display is getting low. Where desired, it can report not only the presence of certain marketing materials, but also whether or not they have been displayed in the proper location within a store. The system can also report the cumulative number of days a store is out of compliance. It can also monitor and report the displayed price associated with particular signs or marketing materials. The system can also monitor and report exposure of particular shoppers to signs and marketing materials that are being monitored by the system.

The system will therefore allow companies to monitor and remedy compliance problems during an advertising program, which will improve overall compliance and increase the effectiveness of the advertising program. It will also allow fee-based marketing programs that are conditional upon certain retail conditions being present at a particular time to be executed with more precision, reliability, and verifiability. Furthermore, it will allow the flow of specific shopper traffic within a store to be monitored and analyzed. In addition, the system will allow subsequent marketing programs, such as coupons or direct mail, to be tailored to or made conditional on shopper interests, shopping patterns, or prior exposure to marketing materials.

Therefore, it is desirable to provide an advertising or marketing material compliance monitoring system that provides compliance monitoring in a timely and cost effective manner.

It is also desirable to provide an advertising compliance monitoring system that makes determining compliance easy.

It is desirable to provide a wireless compliance monitoring system that uses active tags that conserve battery power.

It is also desirable to provide a wireless compliance monitoring system that uses active, passive and/or backscatter tags to determine the specific location (within a defined range) of selected marketing materials and/or version of selected marketing materials.

It is desirable to provide a wireless compliance monitoring system that uses contact technology (such as EEPROM, optical, notch, and conductive or magnetic ink) to determine the specific location (within a defined range), featured price, low-product conditions on a display, and/or presence/version of selected marketing materials. It is also desirable to provide a wireless compliance monitoring system that includes a Backscatter Reader System that uses Backscatter Tags and Backscatter Reader Transponders.

It is desirable to provide a compliance monitoring system that uses passive tags that are small and light, making it easier to secure to advertising signs.

It is also desirable to transmit data from sign locations to a central collection point at individual retail sites using wireless technology for ease of installation at retail sites.

It is desirable to provide a switch on the reader for switching a tag between different power conservation modes, such as OFF, sleep mode, or continuous monitoring mode.

It is also desirable to transmit data from each retail site to a central storage/processing location to report individual and aggregate retailer execution of and consumer exposure to specific and aggregated marketing programs.

Thus, a need exists for an advertising compliance monitoring system that provides versatility and flexibility by providing a tag, associated with a specific sign that communicates tag data to an external reader. The system described herein provides a way to quickly and positively identify each tag, determine the status of each sign (e.g., delivered, displayed), monitor compliance with a marketing program, monitor customer exposure to a marketing program, and analyze tag data relating to the display of and exposure to advertising signs, marketing materials, pricing information, marketing program merchandise, and supporting hardware.

SUMMARY

The system described herein overcomes the disadvantages of the prior art by providing an improved system for monitoring compliance with an advertising program. In one embodiment, the system includes a tag, associated with a sign, marketing material, or shopper identification card, for communicating with a reader. In one embodiment, the tag comprises an active tag, a passive tag, or a backscatter tag that uses backscatter modulation to transmit data. Backscatter modulation, as used herein, is defined as a method of modulating a continuous wave (CW) from a transmitter by changing the impedance across an antenna on a tag or device. The rate at which the impedance is switched creates a subcarrier that is modulated by data and reflected back to the receiver, where it is demodulated. While backscatter technology is generally known, to applicant's knowledge it has never been employed in the context of an advertising compliance monitoring system.

The novel arrangement of the backscatter system disclosed and claimed herein differs from most backscatter systems (passive or active), which rely on a reader to initiate communications. In the case of passive systems, the tag requires power from a reader in close proximity to the tag before the tag can waken and backscatter a signal. In the case of most active backscatter tags, they await a command from the reader before replying with data. The active or semi-passive backscatter tags (BTs) and contact backscatter tags (CBTs) described herein preferably have no receivers nor do they require power from the reader, hereinafter called a Backscatter Reader Transponder (BRT), in order to backscatter a signal. The BTs and CBTs may run autonomously, periodically waking and backscattering a signal, whether or not a BRT is present. There are three advantages to this approach:
1) simplicity—less to go wrong in the RF domain;
2) lower cost—no receiver components in the tags; and
3) predictable battery consumption—a very accurate battery dissipation model can be used because of periodic and predictable use.

Active and passive tags may each include a memory for storing tag data, a transmitter and a receiver. In the active tag embodiment, the tag uses sleep modes to conserve power. The tag transmits tag data to a reader in response to an interrogation signal, or automatically on a periodic basis. The tag data includes any or all of the following: an identification number used to identify the tag associated with a particular sign and/or the marketing material, site location data (e.g., which retail site and/or location within a retail site where the marketing material should be displayed), and, if desired, time and date information. This data is processed by a central server to determine compliance with a particular advertising program.

In one embodiment, the reader associated with a given location at the retail site communicates with one or more tags to detect their presence and obtain their tag data. A hub communicates with each reader and stores the tag data for all reader locations at a given retail site. The hub communicates with a central server to convey information such as displayed signage, featured price, marketing materials, and/or shopper exposure to marketing materials at that site. A central server stores and analyzes tag data from all sites to determine whether each retail outlet is in compliance with a specific advertising program (e.g., to determine if each sign and/or price is being displayed at the time and location specified by the program). The central server can also report which shopper identification cards have been proximate to a given reader.

DETAILED DESCRIPTION

The system described herein determines whether a particular sign is actually being displayed, so that the advertising benefit of the sign can be realized in a cost-effective manner. As used herein, the term "sign" may include marketing materials, displays, pricing information, coupon dispensers, signage, display racks, floor or counter mats, containers, promotional hardware, shopper identification cards, and/or items to be sold under certain conditions (e.g., seasonal promotions, products, or displays and the like), etc.

Figure 1:
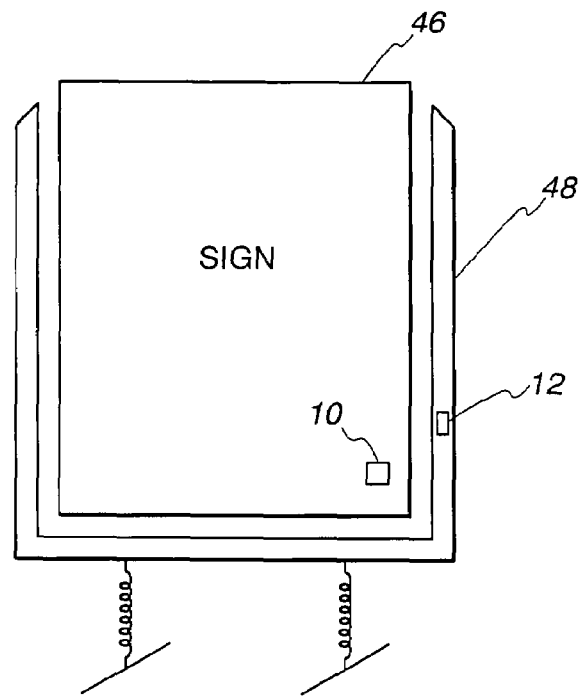
FIG. 1 shows one embodiment of an advertising compliance monitoring system including a sign having a tag affixed thereto, and sign hardware supporting the sign and having a reader affixed thereto.

Referring to FIG. 1, the system includes a tag 10 associated with a particular sign 46, and a tag reader 12 for determining whether the sign 46 is actually being displayed. The reader 12 is generally mounted on sign hardware 48. There are several types of tags 10. Active RFID tags 50 allow one reader 12 to determine whether all the signs in a certain defined area (e.g., on the property of a retail outlet) are being displayed, passive RFID tags 100 may require a reader 12 or antenna 22 for each sign/tag combination.

Some advertising programs require the placement of advertising material within a general area (e.g., a display need only be placed in a department or aisle of a store). Active RFID tags, which contain a battery to permit their data contents to be transmitted over larger distances (e.g., several meters) can be used to monitor compliance with such advertising programs.

Some advertising programs require the placement of advertising material within a certain radius (e.g., a few inches) of a specific location (e.g., signs affixed to product displays or advertisements on a checkout counter near a cash register). Passive RFID tags can be used to monitor compliance with such advertising programs.

Figure 2:
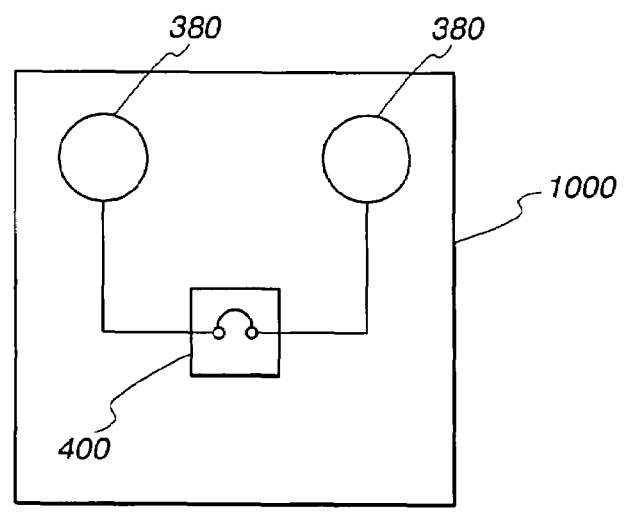
FIG. 2 represents a serial EEPROM contact tag according to one embodiment of the present invention.

Some advertising programs require the placement of advertising material in very precise location (e.g., a particular sign must be placed in a certain holder 48). Contact tags can be used to monitor compliance with such advertising programs. In one embodiment, contact tags comprise Serial Electronically Erasable Programmable Read Only Memory (Serial EEPROM) chips that store tag data. There are several types of Serial EEPROM chips, but most chips include two or three contacts (i.e., a 2-wire or 3-wire interface). Usually, the 3-wire devices have three data transfer wires and an addition wire. The 3-wire interfaces include Serial Peripheral Interface (SPI) and Microwire, which is a trademark of National Semiconductor. The 2-wire devices, called I²C or RC, have only two wires. I²C is a trademark of Philips. FIG. 2 illustrates one embodiment of a 2-wire serial EEPROM chip (contact tag) 1000. The contact tag 1000 includes two contacts 380 and an EEPROM chip 400. In alternative embodiments, the number of contacts 380 may be decreased to one, or increased to three or more.

Figure 4:
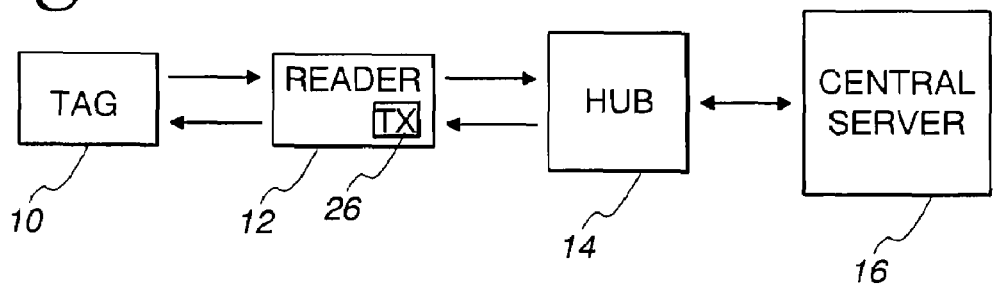
FIG. 4 shows one embodiment of an advertising compliance monitoring system including a tag, a reader, a hub, and a central server.

Referring to FIG. 4, the tag 10 stores identification data, status data, and, if desired, time and date information. By reading this data, the reader 12 can convey the data to a hub 14, which can determine when a sign or marketing material is first displayed, and how long it has been displayed. A hub 14 can send the data to a central server 16 that allows advertisers to verify whether their advertisements or promotional materials are actually being displayed.

In one embodiment, the tag 10 is activated manually by a portable reader, either before shipment of the marketing material or at the retail outlet. In another embodiment, the tag 10 is activated at the factory, before the marketing material is shipped.

Figure 3:
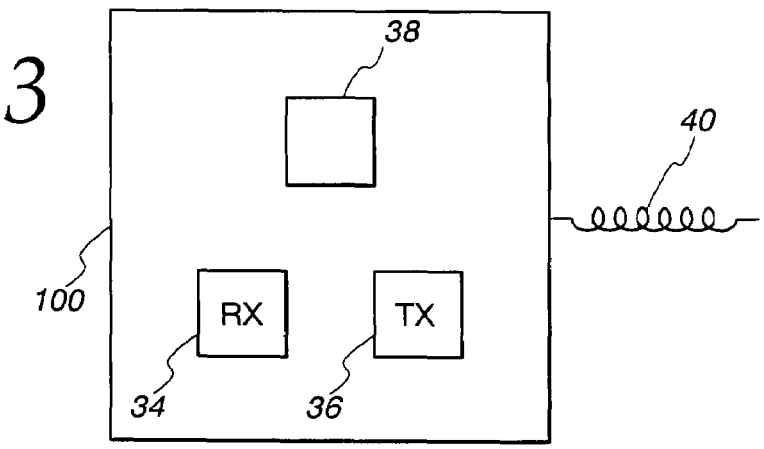
FIG. 3 represents a passive RFID tag, including a coil antenna, according to one embodiment of the present invention.

In one embodiment, the tag is a passive tag 100, as shown in FIG. 3. Passive tags rely on inductive (magnetic) coupling or capacitive coupling. To communicate with a passive tag 100, the reader must be in close proximity to the tag to allow communication between the tag and the reader. A passive tag is not self-powered, it has no battery. Communication is achieved, for example, by inductively coupling the reader and the tag. This allows the reader to provide the tag with a signal that includes the power necessary for the tag to respond to the reader and transmit its tag data. Passive tags 100 are generally smaller than active tags 10. Passive tags are generally read by a reader 12 that is mounted on the sign hardware 48, see FIG. 1. The reader 12 can detect the presence of a sign 46 that includes a passive tag when the sign is inserted into the sign hardware 48 or is proximal to a reader 12 that has been installed at the intended display location. As shown in the embodiment of FIG. 3, the passive tag 100 includes a receiver 34, a transmitter 36, a memory 38, and a coil antenna 40.

Figure 13:
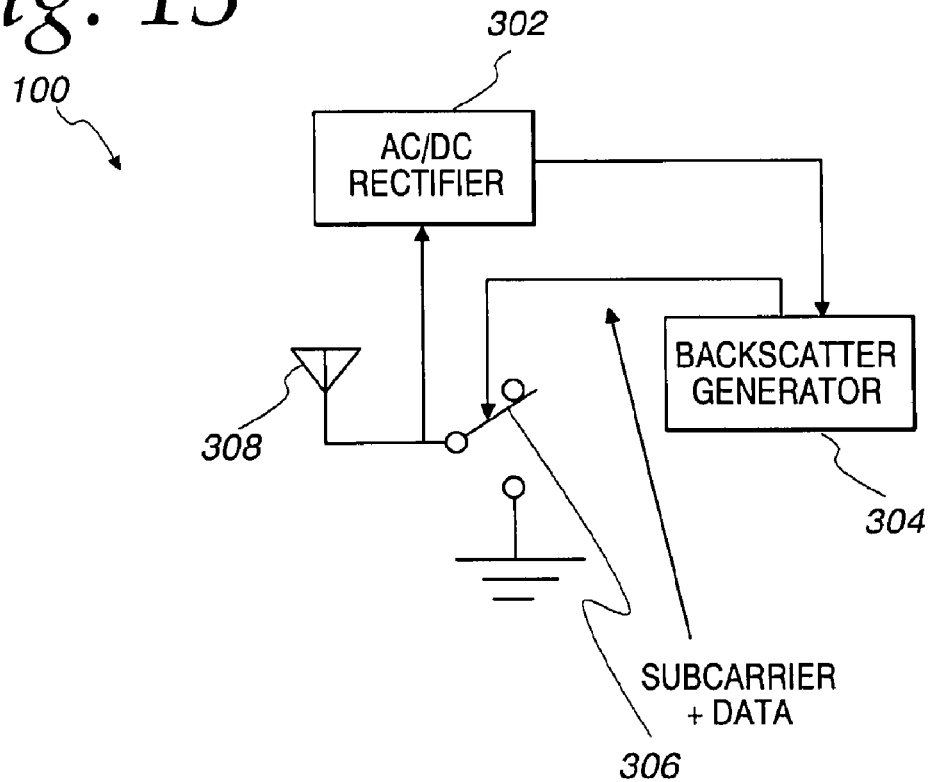
FIG. 13 shows a block diagram of a passive tag.

Another embodiment of the passive tag 100 is shown in FIG. 13. This block diagram illustrates the tag components, which include an AC/DC rectifier 302, a backscatter generator 304, a switch 306, and an antenna 308. In one embodiment, the switch 306 is implemented as a diode. When tag 100 is in close proximity to a reader 12 the RF energy is inductively coupled to the tag. The AC signal from the reader 12 is rectified and converted to a DC voltage. Once the tag 100 is powered, it produces a backscatter signal by changing the impedance of the antenna at a subcarrier frequency. In this way, tag data (e.g., the tag's unique ID) is sent to and interpreted by the reader 12. Passive RFID tags generally consist of a single antenna (usually a coil) and do not include a power source (e.g., a battery).

Figure 14:
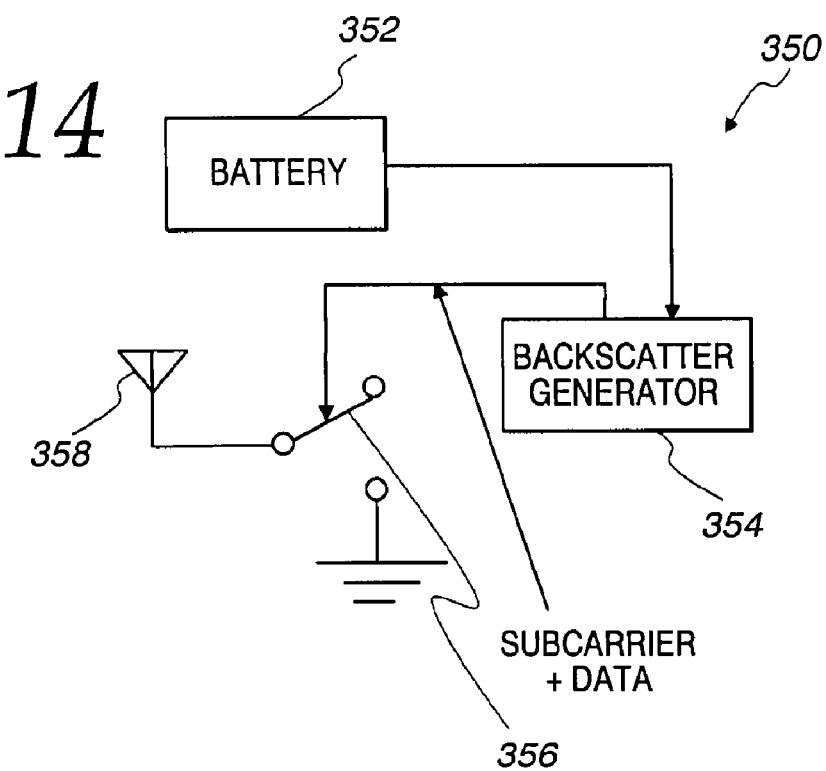
FIG. 14 shows a block diagram of a backscatter tag.

In a further embodiment, the tag is a backscatter tag (BT) 350, as shown in FIG. 14. This block diagram illustrates the tag components, which include a battery 352, a backscatter generator 354, a switch 356, and an antenna 358. In one embodiment, the switch 356 is implemented as a diode. The backscatter tag 350 does not derive its power from the reader 12 via inductive coupling. Rather, the tag 350 includes a power source (such as battery 352). Moreover, contrary to a passive tag, a backscatter tag does not know when a reader is in close proximity to it. Instead, the BT 350 periodically wakes-up and sends out a backscatter signal. If a reader 12 is within range and is transmitting a carrier wave, then the reader will receive tag data from the BT 350.

Active tags 50 allow one reader 12 positioned at a central location to read one or more tags associated with one or more signs or marketing materials displayed at the retail outlet. In order to conserve power in active tags, these tags use a "sleeping" routine wherein the tag only periodically "wakes-up" to look for interrogation signals from a reader or periodically awakens to transmit data autonomously. Upon detection of a transmission that is likely an interrogation signal, the tag fully awakens to an interrogation mode, verifies that the interrogation signal is valid, and responds to the valid interrogation signal by, for example, transmitting tag data to the reader 12. The tag also may be programmed to wake-up periodically and transmit its data on an autonomous basis, without being interrogated by a reader 12.

The system described in more detail below provides a means of determining compliance with an advertising program by associating RFID tags with signs or marketing materials to be displayed at various locations at a retail outlet. The system can be used with an existing customer service call center to increase retailer compliance with Point of Purchase (POP) advertising programs. The system also provides an efficient and accurate way to perform compliance analysis, which assesses the degree to which retailers comply with each POP advertising program and the marketing value associated with a given advertising program. The system can also be used to generate "alert" e-mails, voicemails, and/or be combined with an Interactive Voice Recognition (IVR) system to remedy out-of-compliance situations. To generate an alert, the tag 10 transfers tag data to the reader 12 (in FIG. 4), which is communicated to the hub 14. This data can then be transferred to the central server 16 where, in a well-known fashion, the data can be sent via e-mail, voicemail, or an IVR system to inform one of more individuals of an event (e.g., a store is out of compliance).

Referring again to FIG. 4, in one embodiment the system includes four main components: a tag 10, a transceiver (reader) 12, a hub 14, and a central server 16. In one embodiment, the small tag 10 is affixed to a sign 46, either at the time of production or before delivery to a retail outlet. As used herein, affixed is defined as: mounted, integrally formed, adhered, fastened, etc. The tags will enable each sign to be encoded with information about when and where the signs or marketing materials should be displayed according to a given POP program. The reader 12 will periodically read data from the tags within range of the reader. Alternatively, the reader could manually read the tags at the command of a user (e.g., compliance inspector). In one embodiment, the readers 12 communicate with a hub 14 that would generally be located at the retail outlet. The hub 14 is connected to the central server 16 via a communications link (e.g., a telephone line). The central server 16 will receive the details of each POP program, including participating sites and desired display locations at each site. The central server 16 will also upload data from each hub 14 for compliance analysis.

When signs or marketing materials arrive at their destination, the tags 10 associated with each sign can be read and registered as "delivered" by a transceiver, such as reader 12. The transceiver can read the presence of the signs or marketing materials even before they are unpacked. The signs or marketing materials will remain in storage until the beginning of the marketing program. In one embodiment, the hub 14 includes a display for announcing the beginning of a program, and instructing the retail outlet to install the signs or marketing materials in their respective locations. The hub 14 also receives and interprets tag data and provides command signals to the reader 12.

The reader 12 can be located on the sign or marketing material hardware 48 (e.g., frame) into which the sign or marketing material is placed. The reader will detect the presence of the tag 10 and register that the sign or marketing material 46 is "displayed." In one embodiment, each tag 10 has a transmission range of about seven feet. Thus, several signs or marketing materials can be tracked at a given retail site by one reader. Signs or marketing materials may be displayed close together, for example, at a gas station pump strip, on a pump topper, and adjacent several pump hose "squawkers" (small signs attached to a gas pump hose). Because each sign 46 is uniquely tagged, a single reader 12 centrally located on the pump can register and report the status of all signage or promotion materials associated with that pump. Moreover, seven feet of separation is generally sufficient to distinguish signs or marketing materials associated with one pump from the signs or marketing materials of an adjacent pump. This range of inclusion/exclusion is also appropriate for various in-store merchandising configurations, such as a cosmetic aisle, or to distinguish marketing materials displayed on one gondola vs. another.

Given a short RFID transmission range, only those signs or marketing materials unpacked and placed into display hardware 48 will be registered as "displayed." Repeated polling (e.g., taking several reads every 24 hours) will establish continued compliance with a given POP program. When a single reader detects the presence of several signs or marketing materials that are intended for different locations (or no signs at all), the central server 16 will determine that the signs have either not yet been received, have not been unpacked, or are being stored in a central location and not being displayed. This information will allow a Customer Service Representative (CSR) to call the retail outlet and investigate the noncompliance in a timely manner. Alternatively, the system can notify or escalate notification to appropriate personnel using, for example, e-mail, voicemail, or Interactive Voice Recognition (IVR).

In one embodiment, each reader 12 includes a small RF transmitter 26 having a transmission range of 1,000 feet. Each reader will store the tag data from all the tags located within range of the reader. Each reader will also indicate the absence of any tags. The hub 14 will periodically poll the reader to upload the tag data. The reader will communicate with the hub 14 by selecting an interference-free RF channel from among several frequencies.

In one embodiment, the readers are permanently attached to and shipped with display hardware 48, or made available for permanent installation on an after-market basis. A percentage of signs or marketing materials, such as freezer static cling advertisements, do not require display hardware. For these signs, a reader 12 having an adhesive backing can be positioned within a short distance (e.g., seven feet) of the tag 10. In one embodiment, the readers 12 will be battery operated, which avoids the need for expensive or intrusive wiring.

In addition to triggering and collecting polling information every few hours, the hub 14 will serve as a storage device for current and prior readings for each display location at a given retail site. In one embodiment, at a prescribed time (e.g., 2 A.M.), or periodicity (e.g., every 2 hours), the hub 14 will test the local telephone line for availability, and place a toll-free call to the central server 16. Once a connection is established, the server will receive the tag data, reset the hub registers, and send any updated program information to the hub. Alternatively, the hub may transmit changes in reader status in real time to the central server 16. There, a notification can be sent to appropriate personnel using, for example, e-mail, voicemail, Interactive Voice Recognition (IVR), pager technology, or Internet communication.

The central server 16 will aggregate the tag data for all retail sites, and report all locations not complying with a prescribed POP program. Details about specific sites out of compliance, including contact name and telephone number, will be communicated to appropriate personnel. For example, a customer service representative can use all available information about the non-complying site to ascertain what is preventing POP execution in a timely manner, and attempt to remedy the non-compliance. Several different POP programs can be monitored and reported at any particular time.

In one embodiment, data from the system can be integrated with Point Of Sale (POS) scanner data to assess the impact (or commercial success) of a given program, and how such success relates to advertising compliance. The system can also be used to compare the effectiveness of one POP program versus another program, or a predetermined target or standard.

Typically, a dozen or more POP programs are executed at each retail site over the course of a year. Improving advertising compliance could greatly increase product/service revenues.

In addition, companies that sponsor POP programs often offer payments to retailers for their participation in such programs, with such payment conditional upon display of certain marketing materials. Improving knowledge of specific participation levels and dates could greatly improve the effectiveness and efficiency of POP programs.

The system described herein can be used at retail outlets including: gas stations, convenience stores, grocery stores, mass merchandise outlets, drug stores, specialty retail outlets (e.g., pet stores, record stores, movie rental stores, book stores), consumer electronics stores, movie theaters, and the like.

A tag, such as an RFID tag or contact tag, could also be used by the sign and marketing material manufacturers to improve shipping operations (by, for example, tracking shipments, or verifying the contents of a carton of marketing material prior to shipment).

Figure 5:
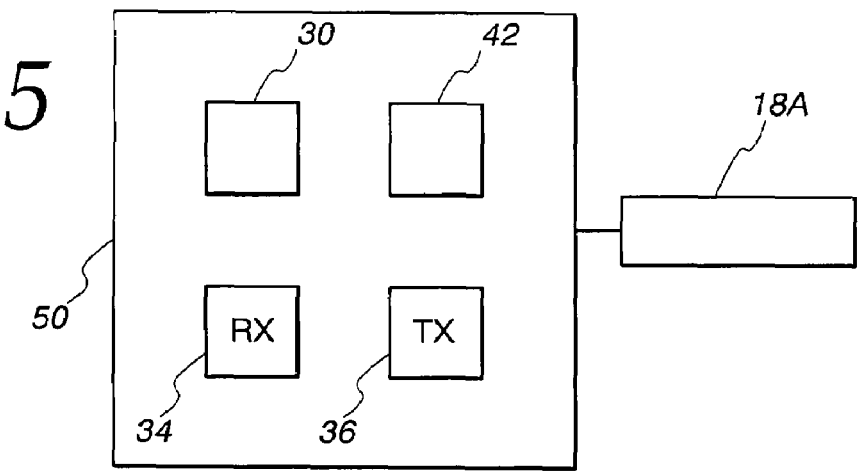
FIG. 5 represents an active RFID tag, including a monopole antenna, according to one embodiment of the present invention.

Illustrated in FIG. 4 is a block diagram of one embodiment of the advertising compliance monitoring system which includes a tag 10, a reader 12, a hub 14, and a central server 16. In one embodiment, the tag is an active RFID tag 50 (the tag is self-powered by a battery). In another embodiment, the tag is a passive RFID tag 100 (the tag is not self-powered, but receives energy electromagnetically from an external signal supplied by a reader). In a further embodiment, the tag is a backscatter tag 112 (the tag uses backscatter modulation to transmit data). In the active tag embodiment, the active tag 50 may include a microprocessor (having a memory) 30, a receiver 34, a transmitter 36, a battery 42, and an antenna 18, as shown in FIG. 5. Signals are transmitted from and received by the tag 50 through the antenna 18. As used herein, microprocessor is defined as any processor, microcontroller, or custom IC, such as a FPGA, ASIC, etc.

To conserve battery power in active tags 50, these tags use a "sleeping" routine wherein the tag only periodically "wakes-up" to a search mode to look for interrogation signals from a reader. Upon detection of a transmission that is likely an interrogation signal, the tag fully awakens to an interrogation mode, verifies that the interrogation signal is valid, and responds to the valid interrogation signal by, for example, transmitting tag data to the reader. In the preferred simplified version, the tag may be programmed to wake-up periodically and transmit its data on an autonomous basis, without being interrogated by a reader. This requires a less costly tag and reader.

The tag 10 may be affixed either to a sign or to marketing material associated with a given marketing program. In one embodiment, the tag 10 is affixed to an advertising sign or marketing material to be displayed, either when the sign or marketing material is produced or before delivery of the sign or marketing material to a retail outlet. The tag 10 may include an internal clock and a memory. The tag may store any or all of the following: tag data including an identification number, when the tag is delivered and displayed, and advertising information regarding when and where the sign or marketing material associated with the tag should be displayed according to a given advertising program.

The reader 12 will periodically read the tag data from the tag(s) within range of the reader 12. Alternatively, the reader 12 could manually read tag data from the tag(s) at the command of a user (e.g., compliance inspector). Once the tag data is received by the reader 12, it will be stored in memory. The reader 12 communicates with the hub 14 via a communication link 20. The hub is physically displaced from the reader 12, and is generally located in the retail outlet. The hub communicates with the central server via a communication link (e.g., a telephone line). The central server 16 is physically displaced from the hub 14, and is generally located hundreds or thousands of miles away from the hub. The central server 16 receives the details of each advertising program, including a list of participating sites and desired display locations at each site. The central server 16 will periodically receive tag data from each hub and perform compliance analysis for each advertising or POP program.

The reader 12 is designed to operate interactively with the tag 10. The reader 12 may be a hand-held unit or a fixedly mounted unit. Typically, the reader 12 is affixed to signage hardware 48. In one mode, the reader 12 will periodically transmit a command signal for interrogating any tags within range of the reader. When a sign 46 is displayed in the signage hardware 48, the reader 12 will detect the tag 10 associated with the sign after the next command signal transmission. In response to the command signal, the tag 10 will transmit any or all of the following: its tag identification number, any status data (e.g., delivered, displayed), and, if desired, the time and date corresponding to the status. For example, if the sign was "displayed" at 6:30 p.m., on Jan. 25, 2002, the tag will transmit: status—displayed, time—6:30 p.m., date—Jan. 25, 2002. This tag data will be stored by the reader 12. The hub 14 can determine when a given reader 12 first reported the presence of the tag 10 and the time and date logged at the hub or any other relevant data. Alternately, the hub 14 need not store the status data or time and date information. The central server 16 can determine when a given reader 12 first reported the presence of a tag 10.

Figure 10:
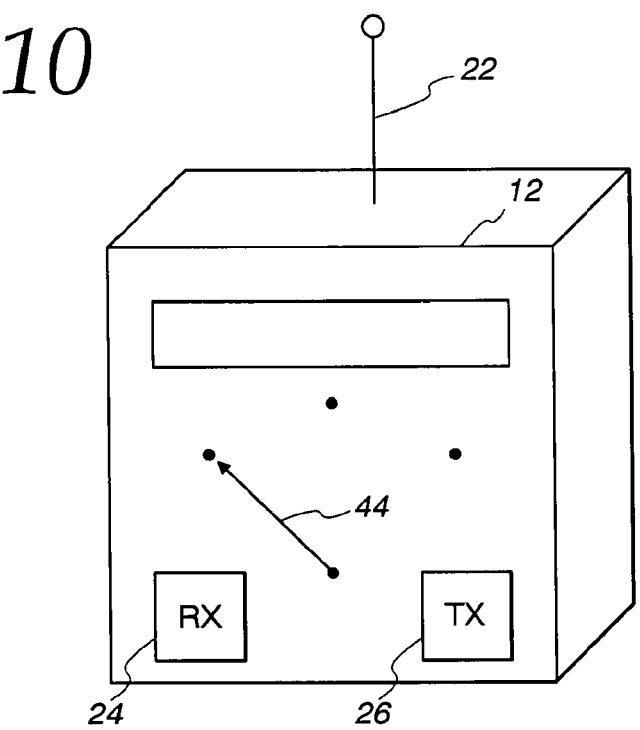
FIG. 10 shows a hand-held or permanent (fixed) reader including a switch for switching the tag between different power conservation modes.

FIG. 10 illustrates one embodiment of a hand-held or permanent (fixed) reader 12 that includes a switch 44 for switching the tag 10 between different power conservation modes, such as OFF (e.g., no monitoring), sleep mode (e.g., POP compliance monitoring), or continuous monitoring mode (e.g., consumer exposure monitoring). The reader 12 further includes an antenna 22, a receiver 24, and a transmitter 26. The antenna 22 is configured to receive signals from and transmit signals to the tag antenna 18. The reader 12 interacts with each tag 10 via a communication channel. Likewise, the reader 12 interacts with the hub 14 and/or the central server 16 via another communication channel. The communication channels may include an Ethernet link, Internet link, wire link, wireless link, microwave link, satellite link, optical link, cable link, RF link, LAN link, or other communication link.

The tag data obtained from individual tags 10 maybe uploaded through the reader 12 to the hub 14 to the central server 16, which may include a database of all tag data. This data is then analyzed to determine which retail outlets are out of compliance with specific advertising programs.

In one embodiment, the tag antenna 18 may be a monopole antenna 18A, as shown in FIG. 5. The monopole antenna 18A is a generally factory tunable antenna that achieves the same RF signal capability as a dipole configuration, but is smaller in size. Thus, the monopole antenna 18A enables the manufacture of a smaller tag having less mass. In one embodiment, the antenna 18A is made of standard bus wire.

Figure 6:
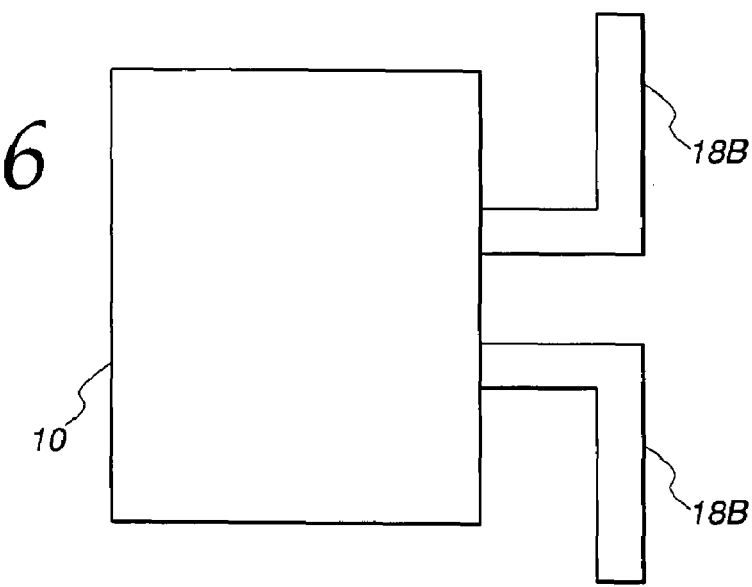
FIG. 6 represents an RFID tag, including a dipole antenna, according to one embodiment of the present invention.

FIG. 6 illustrates the tag antenna 18 as a dipole antenna 18B, having arms extending in a dipole fashion and connected to the electronics of the tag 10. In one embodiment, the antenna 18, along with the tag electronics, can be encapsulated in an epoxy, such as Stycast®, and then affixed to the sign 46, as shown in FIG. 1.

Figure 7:
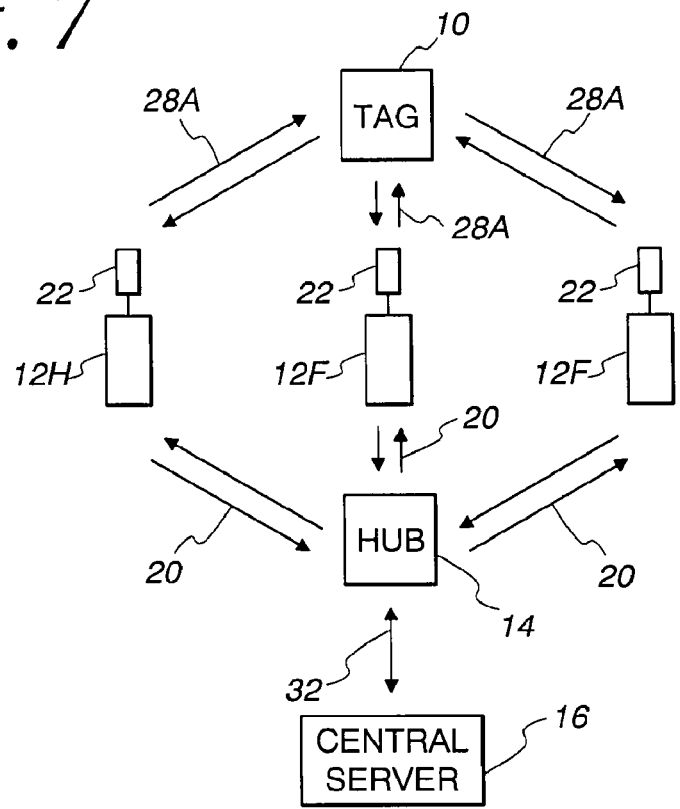
FIG. 7 shows one embodiment of an advertising compliance monitoring system including a tag, a reader and antenna, a hub, and a central server.

FIG. 7 illustrates one embodiment of the advertising compliance monitoring system, including a portable or hand-held reader 12H that is used for, inter alia, initially programming a tag 10 after a sign is made, before it is shipped, or after it is received by a retail outlet. In one embodiment, the tag 10 can also be reprogrammed so that tags on signs to be discarded can be remounted on different signs that are going to be deployed. Hand-held readers 1 2H are generally battery powered and include a keypad/keyboard, touch screen, or other input device known in the art, an LCD display for user interaction and data display, and sufficient memory to retain tag data from multiple tags before that data is uploaded to the hub 14.

Also shown in FIG. 7 is a multitude of fixed readers 12F, each having an associated antenna 22. The hub 14 is a separate component that is in communication with readers 12H, 12F through a communication channel 20. The hub 14 communicates to the central server 16 via a communication channel 32. As used herein, the term "communication channel" includes communication via an Ethernet link, Internet link, wire link, wireless link, microwave link, satellite link, optical link, cable link, RF link, LAN link, RS-232 serial link, telephone lines, or other communication link.

As shown in FIG. 7, data from the hub 14 is transferred to the central server 16. In one embodiment, the information from the hub 14 is transmitted across a communication channel 32, such as the Internet, to the central server 16. The central server 16 may be a personal computer, web server, or other computer with appropriate software to run and maintain a database of tag data. The central server may be accessed from a remote computer via, for example, the Internet. The reader 12, the hub 14, and the central server 16 may be, for example, two or more separate units, one computer partitioned into different virtual machines, or one virtual machine, acting as two of the components, that is connected to a second computer or processor acting as the third component.

Some advertisements contain a featured price that may change independently of the sign or display with which it is associated. In such cases, the tag 10 can be used to report such featured pricing information, in addition to sign and/or display information (such as "delivered," "displayed," etc.). In one embodiment, contact tags 1000 are used to monitor the value of each digit in a featured price of an object or item (e.g., $32.89 would be read by using 4 or more digits, each having a contact tag 1000 associated therewith). A single reader 12G (see FIG. 8) is used to monitor all the digits and report the entire price as a single data field. Other components of a featured price that could be monitored include qualifying information about the conditions of the price (e.g., "per pack", "per carton", "2 liter bottle", "limit one per customer", or "buy one, get one free") and/or the brand being featured, such as the registered trademarks for "Winston," "Salem," "Coke," or "Bud Light."

In another embodiment, one or more two-position contacts 1000 are placed on opposite sides of each digit of the displayed price. Each digit of the price is encoded via holes or notches (or the absence of a hole of notch). When a hole or notch is encountered, the two opposing contacts physically touch each other, which creates a closed circuit. Each two-position contact 1000 is connected to the group reader 12G, which detects whether each contact is an open circuit or a closed circuit. The single reader 12G monitors all the digits and report the entire price as a single data field.

Figure 8:
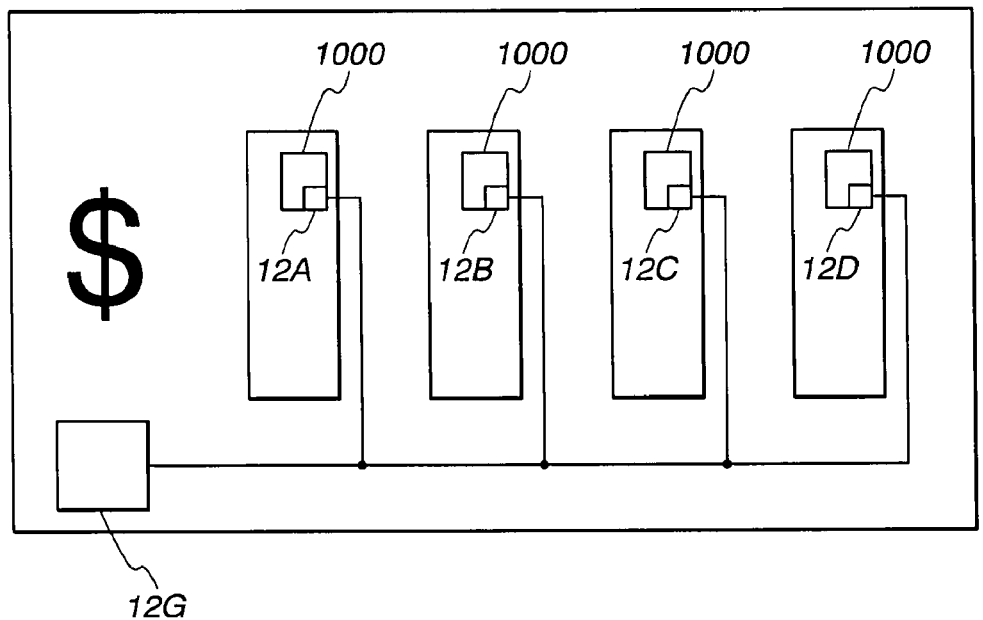
FIG. 8 shows a price reporting embodiment of the invention.

One embodiment of the invention used for price reporting is shown in FIG. 8. Each digit of the price includes a contact tag 1000. In this embodiment, individual readers 12A-12D are disposed on the digit holders such that each tag 1000 (disposed on a respective digit) makes contact with one of the respective readers 12A-12D. In this way, each digit of the price is monitored by one of the individual readers 12A-12D. Each of the readers 12A-12D may include a battery and a data management module, in addition to the contact reading and storage circuitry. The output of the individual readers 12A-12D is fed to the single group reader 12G, which communicates with the hub 14 and/or the central server 16. The data management module takes a data stream from the tag, converts that data stream into a standard data stream, such as an RS-232 data stream, and communicates the tag data to the reader 12, which relays the data to the hub 14 and/or the central server 16. The contact reading and storage circuitry allows each reader 12A-12D to read data from a respective contact tag 1000 and store that data.

In one embodiment, each reader 12 has the same back-end (i.e., transmitter and receiver components for communicating a specific data stream to the hub and/or central server) and several interchangeable front-ends (i.e., different data management modules for receiving data streams from different types of tags, such as passive, active and contact tags). The data streams from different types of tags may be different. Therefore, the interchangeable front-ends allow a reader 12 to communicate which different types of tags. The specific data stream sent to the hub and/or central server may be a standard data stream, such as an RS-232 data stream.

In one embodiment, the contact tag reader 12G includes a small set of contacts for stimulating a contact tag and receiving its data. The contact tag reader may be battery operated, and use sleep modes to conserve power, as discussed below. The contact tags 1000 may include two-position contacts that are placed on opposite sides of a sign or price.

In another embodiment, the contact tags are implemented using optical, notch, conductive or magnetic ink technologies. Magnetic or conductive ink technology can be used to monitor pricing information or presence/absence of inventory on a display shelf. In one embodiment, magnetic ink similar to that used to process checks is placed on pricing elements (e.g., plastic loose-leaf or spiral bound items having digits for displaying a featured price), or on the bottom of individual packages or products for display on the shelves. Such ink is read by a contact reader(s) that can distinguish patterns of magnetic field intensity. In another embodiment, conductors (e.g., formed by conductive ink or foil) are placed on a shelf and on the bottom of individual packages or products for display on the shelf. The conductive ink on the products makes an electrical connection between at least two of the conductors to form a closed circuit, as explained below in relation to FIGS. 17-18.

In one embodiment, infrared or laser scanners are used to read pricing information. Such a scanner can detect patterns of light and dark printing on pricing elements based on the variation in light reflected back to the scanner. In another embodiment, a bar code scanner is used to read pricing information.

In a further embodiment, notch technology is used to read pricing information or a code associated with a particular piece of marketing material, such as a specific sign or display. For example, each pricing element (e.g., a plastic or cardboard card) may include a series of positional depressions, holes (or the absence of them), or inconspicuous holes along the perimeter of the pricing element (or a portion thereof). In one embodiment, the presence or absence of a notch or hole in a given position is converted to a data stream via a series of two-position contacts on the price holder. When a hole or notch is encountered, the two opposing contacts physically touch each other, which creates a closed circuit. This closed circuit is detectable by a contact reader connected to the two contacts. Notches may also be used by optical detecting circuitry to identify a sign or price via an encoded ID number.

In one embodiment of the compliance monitoring system, the tags 10 store sign information (e.g., display status, identification data, time and date information, etc.). In another embodiment, the tags 10 store only a tag identifier, which may comprise a 32-bit unique identification number. This identifier is associated with extensive descriptive information stored on the central server 16. This descriptive information corresponds to the specific advertising material associated with the tag 10. In one embodiment, the tag identifier and the descriptive information are synchronized when the tag 10 is assigned and affixed to a particular sign 46. If a tag 10 is re-used (i.e., associated with a different sign) its unique tag identifier is reassigned to the descriptive information on the central server 16 corresponding to the new sign associated with the tag 10.

Some retailers may expect payment for placing hubs, readers, and tags within their stores for purposes of monitoring their compliance with advertising programs. Therefore, in one embodiment, the readers 12 are used for consumer exposure monitoring. In this embodiment, the system may be used in conjunction with a retailer's frequent shopper or loyalty program to inform the retailers and manufacturers about the advertisements having the most appeal to shoppers (e.g., which advertisements shoppers closely investigated for a predetermined amount of time). In this embodiment, frequent or loyal shoppers are issued shopper identification cards having unique RFID tags for storing information about the shoppers. As a shopper proceeds through a store, if the shopper closely investigates a particular advertisement having an RFID tag, the shopper could flash his/her RFID card in the vicinity of the sign (i.e., move the card near the sign) to trigger data transfer to the reader. In another embodiment, the card's proximity to the sign could trigger data transfer to the reader (e.g., the card could be read in a shopper's purse). Information about which signs and the number of signs flashed by each customer (or the number of signs the shopper investigated such that card data was transferred to one or more readers) is reported to the retailer and/or to manufacturers. This consumer exposure information is used to help improve the value of a retailer's frequent shopper program, determine shopper traffic patterns through a store, and/or is integrated with purchase information to provide additional and/or personalized incentives to the frequent shoppers. In another embodiment, information about which advertisements interested consumers during shopping could be used to focus subsequent advertising material, such as direct mail. These embodiments would enable more effective and more relevant marketing programs for both manufacturers and retailers.

Figure 9:
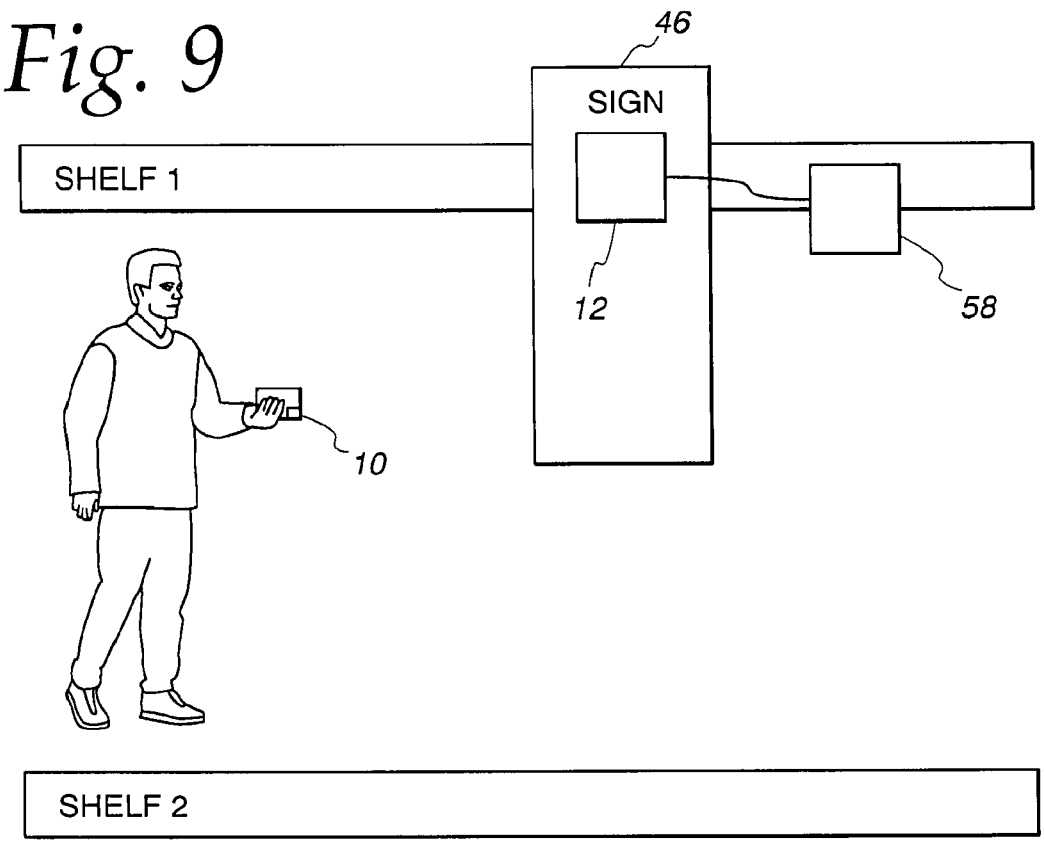
FIG. 9 shows a consumer exposure monitoring embodiment of the invention, the system including an advertising sign, a reader, a customer card with an embedded tag and a display device.

FIG. 9 illustrates use of the system to monitor customer exposure to a particular advertising promotion in a store having two shelves. The customer is shown carrying a shopper identification card having a tag 10 (e.g., active, passive or backscatter) embedded in it. A reader 12 is associated with a sign 46 and reads the presence of the tag 10 when the customer card is adjacent the sign 46. The shopper may flash his/her card in the vicinity of the sign, and/or the reader may acquire the tag 10 when the card is within range of the reader 12. When the consumer card has been read, a confirming light or message is displayed by a display device 58 disposed on or adjacent the sign 46.

In FIG. 1, a sign 46 having a tag 10 affixed thereto is illustrated. The sign 46 is supported by sign or marketing material hardware 48, which has a reader 12 affixed thereto. In one embodiment, the reader 12 communicates with the tags 10 over a wireless RF link (e.g., 28A) operating at a frequency of about 13.56 MHz (which is an example of a frequency used to read passive RFID tags). The reader 12 and the tags 10 can communicate over any wireless link (e.g., 28A) and use any suitable frequency band. The Industrial, Scientific, and Medical (ISM) frequency band is 902-928 MHz. The ISM frequency band is primarily intended for unlicensed transmitters, which have been certified under Part 15 of the Federal Communications Commission Code (47 C.R.F. §15). Many devices such as cordless phones and wireless LANs share the ISM frequency band and the claimed system is designed to coexist and operate robustly among these other devices. Other frequency ranges can be used without departing from the invention. For example, the reader 12 and the tags 10 can communicate at a low frequency (e.g., about 125-134 kHz).

To minimize signal interference, the frequency of the forward link channel (i.e., reader to tag) is varied among several of the available RF channels in the ISM frequency band in a pseudorandom manner (frequency hopping). Each forward link command is transmitted on a frequency different than the previous command in a pseudo-random manner to avoid continuous interference from other devices operating in this frequency band. Frequency hopping also allows the system to transmit the maximum signal radiation (+36 dBm) under 47 C.R.F. §15.

The active tags 50 provide several features, including: a unique tag identifier for identifying a specific tag and determining the status of the sign associated with the tag (e.g., delivered, displayed), the ability to transmit tag data autonomously to a reader, and the ability to archive tag data taken since the last upload to the reader 12.

As shown in FIG. 5, the tag microprocessor 30 communicates with the RF transmitter 36. The RF transmitter 36 is in communication with tag antenna 18A. The tag 50 is supplied with power by a battery 42.

Each tag may include one or more of the following features:

A unique tag identification number—this number specifically identifies a particular tag 10. The tag identification number is typically the tag serial number. This number is programmed into the tag 10 at the factory or during installation (via, for example, a hand-held reader 12H).

A sign or marketing-material-type number—the sign or marketing-material-type identifies the type of sign or marketing material, and when and where it should be displayed pursuant to a particular advertising program. This number may also be programmed into the tag 10 at the factory or during installation (via, for example, a hand-held reader 12H).

Write-in capability—the tag 50 allows users to write user defined data into the tag memory, including where the sign is being displayed, what type of sign is associated with the tag, etc. This data may be password protected such that only authorized users can write data to the tag 50.

Autonomous transmit (AT)—the tag 50 may be programmed to self-awaken at preset intervals, transmit the tag data to a reader, and go back to sleep without external activation. The tag 50 may be pre-programmed from the factory with a default wake-up interval (e.g., 2.5 seconds); however, the user can change the wake-up interval.

Radio frequency operation—in one embodiment, the claimed system operates at 2.45 GHz, or in the ISM frequency band (902-928 MHz), or at 13.56 MHz, or at a low frequency (e.g., about 125-134 kHz).

Communications—the tag 10 is able to communicate with fixed readers 12F, or handheld readers 12H.

Data display—tag data is displayed by the hub so retail personnel can monitor the status of each sign and receive messages from the central server 16.

Power—the active tags 50 are powered by a battery 42.

Tag life—given current battery capabilities, total tag life is greater than about 2 years, during normal operating conditions, which is greater than the average life of the sign associated with the tag.

Turn-OFF function—the tag 50 can be activated by a handheld reader prior to shipment to a retail outlet, which prevents the tag 50 from being ON during storage of the sign. This extends the battery life of the tag 50.

Reader range—for a fixed reader 12F, in one embodiment the reader range is up to and including about 7 feet. This allows tags associated with signs in adjacent areas within the retail outlet to be differentiated or grouped on the basis of their location. The reader range can be extended to cover between 10-25 meters, effectively covering an entire retail outlet. Hand-held readers 12H can monitor tags up to about 25 meters from the reader antenna 22.

The tag data stored on the central server 16 may be accessed via a local area network (LAN) or the Internet. Tag data may be forwarded to a call center for display on a customer service representative's screen. Using this data, the CSR can call the non-complying retail outlet and try to ascertain the reason for non-compliance with an advertising program and attempt to remedy the situation in a timely manner. Alternatively, the central server 16 may generate and send an e-mail or voicemail to one or ore recipients, or use IVR to track the status of various remedial activities associated with an out-of-compliance situation, as explained earlier.

The reader 12, in one embodiment, initiates RF communication with one or more of the tags 10. In one embodiment, the reader 12 is affixed to the signage hardware 48 that is positioned at various locations within or near the retail outlet (e.g., on a fuel island, on a pump topper, on an external kiosk, on a pump approach, on building signs, on checkout registers, on or near a particular gondola, near the pharmacy or deli section, in the dairy section, etc.). The reader 12 will communicate with each tag 10 to determine if the corresponding sign is being displayed, and gather data, including when the sign was first displayed, when it is removed, etc. The reader 12 may also obtain the tag history data, which includes all tag data since the last time the tag data was uploaded to the reader. The history data is sent from the reader 12 to the hub 14 and then to the central server 16 by a communication channel 32, comprising one or more of an Ethernet link, Internet link, wire link, wireless link, microwave link, satellite link, optical link, cable link, RF link, LAN link, or other appropriate communication link.

Portable or hand-held readers 12H communicate with the tags 10 and gathers tag data, including history data. Handheld readers 1 2H may be used in conjunction with manual inspections, or surveys, to determine if marketing material has been displayed pursuant to a specific program. Alternatively, one or more portable readers may be affixed to selected grocery carts, pallet movers, robots, motorized floor cleaning/polishing equipment, or other devices that are caused to freely roam stores on a routine basis. GPS or other Real Time Location System (RTLS) tools can be used in conjunction with portable readers 12H or BRT 114/116 to note the coordinates of their location when a tag is detected. A BRT 114/116 may also be attached to an overhead device that periodically traverses the ceiling above aisles or a section of the store. In one embodiment, a predetermined course or track is achieved through a small cable (3/16") from which a mobile BRT device hangs. In such a case, any well known positioning device, such as an odometer, measures the current location of the reader along the predetermined route at the time a tag is detected. The linear distance traveled at the time of tag detection by the reader is appended to the data reported by the tag and reader 12H (in FIG. 7) and 114/116 (in FIG. 11) and fed to the hub 14 for transmission to the server 16. These readers 12H decrease the time and cost of surveys by reading all the tags at a specific retail outlet, within a small amount of time, without requiring an auditor. If auditors, delivery, or sales people are present, these devices can rapidly speed their store inspection, perhaps allowing them to examine store conditions without even exiting their vehicle. The hand-held readers 12H provide an "on-site read" of all the tags at a specific location or site. Alternatively, a portable receiver 12H maybe used to receive data from the hub 14, which may contain specific or summary data about the status or history of several readers.

In one embodiment, there are four data relay channels. These channels are used to transmit data from the tag 50 to the reader 12 and/or from the reader 12 to the hub 14. The data relay link packets (DRLPs) are transmitted on each of the channels, sequentially. For example, if the tag 50 responds to a reader 12 with its serial number on channel 1, the tag 50 will then respond to the next reader command on channel 2. If the reader 12 receives bad data from the tag, it will disregard that data. The tag 50 will then retransmit the data on channel 3. If the reader 12 determines that the received data is again corrupt, it will command the tag 50 to retransmit the data. In one embodiment, retransmission of data will continue until the data has been sent five times (once on each channel, e.g., on channel 1, 2, 3, 4, and 1—the first channel is tried twice). If the reader 12 still does not receive good data, it will cease transmitting to that particular tag 50 for a predetermined period of time.

During forward link communication, packets are sent from the central sever 16 to the hub 14, from the hub 14 to the reader 12, or from the reader 12 to the tag 50. During data relay link communication, packets are sent from the tag 50 to the reader 12, from the reader 12 to the hub 14, or from the hub 14 to the central sever 16. The tag data is communicated in this fashion from one device to the next (see FIG. 4). Not all of the devices illustrated are required in the system. For instance, data can be communicated directly from the reader 12 to the central server 16.

Under 47 C.R.F. §15, using spread spectrum transmission (i.e., frequency hopping), the maximum allowable power that can be radiated in free space is +36 dBm (without using spread spectrum transmission, the maximum allowable power in free space is −1 dBm). In the forward link, the amount of power transmitted is measured near the tag. Some attenuation may result from transmission through the sign, and additional attenuation may occur due to interference from other signs, cars and/or structures.

Fifty-one forward link channels were selected in part due to FCC Part 15 (47 C.R.F. §15), which specifies 50 channels as the minimum. It is possible that two tags 50 will awaken at the same time and both be within range of the reader antenna 22. If this occurs, interference may result since both tags 50 may be responding to the same message on the same return link channel. By predetermining different wake-up times and the short duration of data transmitted, this problem is effectively obviated.

The tag 50 may include a microprocessor 30 that controls the operation of the tag 50. In one embodiment, the microprocessor 30 includes two internal oscillators, internal RAM, internal ROM, and other standard features. To maximize battery life, two oscillators are desirable because they allow for two different clock speeds. Having two clocks allows a designer to minimize use of the high-speed clock (thus, conserving battery power). The two oscillators could also be externally supplied to the microprocessor.

An EEPROM can be used for storing tag history data. History data is periodically written from the microprocessor RAM to the EEPROM. The EEPROM is a non-volatile memory; therefore, it does not need power to maintain its information, and can be turned off to conserve battery power.

The tag data from a tag 10 can be accessed via the central server 16, which typically includes a keyboard for data input by a user and a display for data output to a user. The display provides tag data to a user. This data is archived in the central server 16. The central server 16 also provides a LAN or Web interface to the system for providing the tag data to a remote user (such as a Customer Service Representative) and for allowing the remote user to analyze the tag data, or enter user defined data such as the retail outlet where the sign is being displayed, the compliance history of the retail outlet, etc.

Although the embodiment illustrated in FIG. 7 shows the central server 16 in communication with the hub 14, these components may be a single unit or, alternatively, separated by a large distance. The arrangement of components is driven by the implementation in which these components will be used rather than by any requirements of the system.

In addition, the reader 12, the hub 14, and the central server 16 may be two or more separate units, and data may be transmitted between these units using a request/response protocol (where, for example, the central server requests data from the hub) or using a push protocol (where, for example, the hub periodically transmits data to the central server 16 without such data being requested by the central server 16).

The deep sleep mode uses a watchdog timer (WDT) to determine when to wake up. During the deep sleep mode, the microprocessor is not running and all clocks are stopped. Thus, only a minimum amount of power is consumed in the deep sleep mode. When the WDT times out, the microprocessor is started in its low-speed clock mode (referred to as lucid sleep mode), where the tag determines if it is time to enter the search mode. The lucid sleep mode and search mode can be combined into a single mode.

In one embodiment, the system includes an RFID tag that transmits parameters regarding intended location, content, sponsor, purpose, etc. The RFID signal to the reader contains some or all of the following information:

Unique 32-bit tag identifier (may be written to tag at time of marketing material production or shipping, or pre-programmed by tag manufacturer)

---

Product number using "Stub" format:
POP sponsor
Promotion number
Start date
Category
Subcategory
Sign type
Sign placement
Expiration date
Price point
"Per"/disclaimer conditions
Date produced
Sign producer ID
Retail outlet ID

---

In most cases, however, it is easier to associate this and other identification data on the central server to determine the nature and status of each tagged item relative to an expected state. In one embodiment, the system includes a reader that receives and transmits tag data along with reader ID & battery status information. Such a reader may be mounted in a tamperproof package that is securely mountable to sign hardware (e.g., plastic, painted/plated steel, or bare/anodized aluminum) or positioned at a particular location in a store (e.g., at the front end of the second aisle). The reader is removable by authorized personnel for remote repair or repositioning to another authorized location. In another embodiment, the reader is mounted in a tamper-proof package that is securely mountable to glass or painted/plated/anodized metal. In another embodiment, the reader has a switch indicating if it has been moved.

In one embodiment, when the reader is polled by the hub, the reader reads and transmits information from the RFID tag.

In one embodiment, the RFID data may include some or all of the following information:

---

Transponder ID (6 characters, alpha-numeric)
Battery status (1 character, alpha-numeric)
Trouble-light status (1 character, alpha-numeric)
RFID asset tag information (110 characters, alpha-numeric)
Read range (1 character, alpha-numeric)

---

In one embodiment, the system includes a hub that polls readers, displays problem conditions/solutions, polls local phone lines, logs into central server, reports signage information and trouble conditions. Such a hub may be movable, with rubber "feet" for stability.

In one embodiment, the system includes a hub that polls readers, displays problem conditions/solutions, polls local phone line, logs into central server, reports signage information and trouble conditions. Such a hub may be movable, with rubber "feet" for stability.

In one embodiment, the hub may include some or all of the following features:

Auto boot program in power-up/restarts
Remote versioning/upgrades & POP administration
Non-volatile RAM for program & data storage
"Register" the number of transceivers and ID/frequencies/location of each
Seek and register interference-free frequency for each transponder
Turn on a trouble light for a specific reader when signal is weak,
  repeated interference occurs on all channels, no signal,
  or the wrong sign is placed in sign hardware
Ignore certain/all readers when instructed by host
Keep track of time
"Poll" each reader, and store
  its asset information periodically (e.g., every 4 hours)
Compare current vs. prior asset register
Store 2 toll-free phone numbers
Test status of phone line, dial number,
  if unsuccessful dial alternate number
Perform modem "handshake" with central server
Hub data to central server may include some or all of the following:
Time stamp
Hub ID
Changes or additions to transceiver locations
Number of transceiver signals expected
Number of transceivers reporting
"Checksum" stamp from last hub/server connection
Current RFID asset information for each transceiver
Trouble-light status for each transceiver
POP program information for next 24 hours
Hub program updates
New "checksum" stamp from hub/server connection In one embodiment, the system includes a central server that coordinates hub polling, consolidates POP program information, collects and reports signage configuration for each retail site. The central server, in one embodiment, administers POP programs for all registered signage and provides status reports for all sites and programs, with feeds to call center customer service representatives.

In one embodiment, the system includes an RFD writer that writes data to RFTD tags to be affixed to signage during the packing/shipping process. The RFID writer may comprise a hand-held reader 12. The data written to the tags may include parameters for a specific POP program (from the central server) and/or the locations participating in the program. The RFID writer may also register assets to the central server and/or an invoicing/billing system.

In the embodiments above, when a passive tag was used it could report the presence or absence of tags at a distance of about 4 inches and then transmit that information over a 915 MHz radio link capable of working over several hundred meters. It is desirable to have a system that extends the range of detecting and reporting the presence or absence of tags in other range of groupings including 6-10 feet, 15-30 feet, and 60-90 feet or more. To include such grouping ranges permits elements of marketing material to be identified as being within specific locations within a retail environment or in general sections of a store. The inventors have conceived the preferred embodiment detailed as set forth hereinafter.

A technology hybrid solution solves the distance and other problems and is entitled the Contact/Backscatter Reader System (CBRS). Marketing materials can be produced with very inexpensive identifiers on them (e.g., the cost of conductive ink or notched foil placed directly on the materials or onto adhesive labels). A single reader then reads multiple tags further reducing the cost of the system.

The CBRS consists of Hubs, Backscatter Reader Transponders (BRTs), Contact Backscatter Tags (CBTs), and items to be identified through contact points. Backscatter technology is well known in the art and the necessary equipment is available as shelf items, has reasonably precise detection and reporting ranges (the energy returned by the tags varies inversely with the fourth power of the distance separating it from the transmitter), has a low tag cost, and is robust across a range of environments (including outdoors). A specific arrangement for the preferred embodiment and a working example are hereinafter described.

Figure 11:
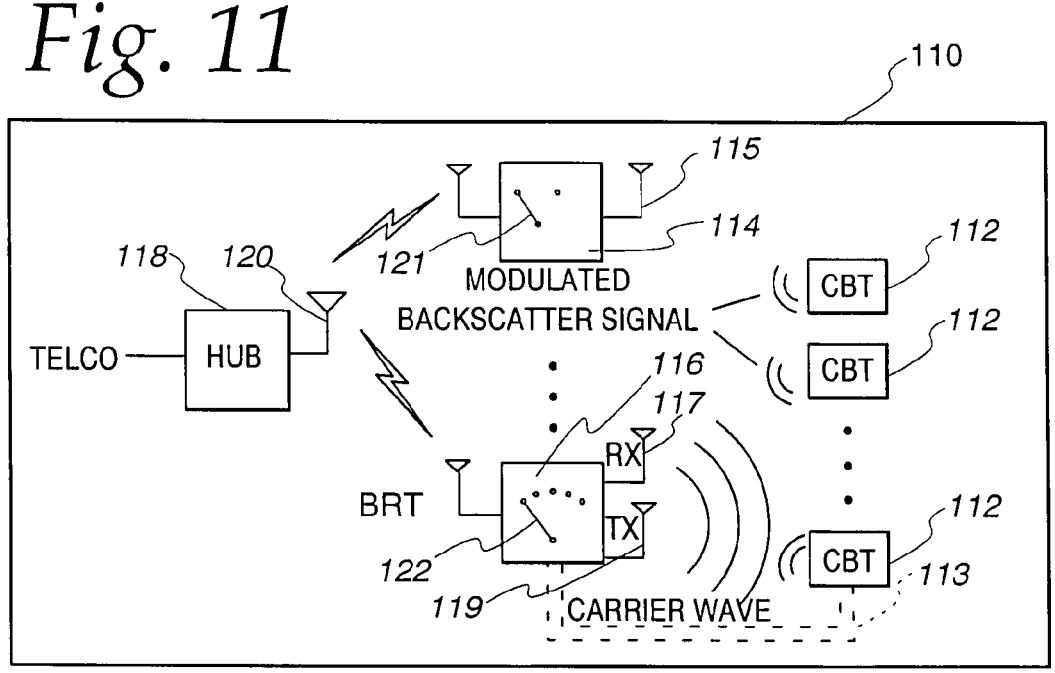
FIG. 11 shows a block diagram of a Contact Backscatter Reader System.

A block diagram of the novel Contact/Backscatter Reader System (CBRS) is shown in FIG. 11. The Contact Backscatter Tags 112 (CBT) may be battery powered and operate in a low-power "sleep mode" the majority of the time. The tags 112 periodically awaken and read the identification of the sign or other marketing material through contact points as explained earlier. The sign ID is established with very low cost methods, such as a conductive ink or holes in conductive foil that create a pattern of insulation (holes) and conductivity (no holes). Punch-outs in the cardboard of the sign or display form a well-know manner for the CBT 112 to identify the sign through optical or contact sensors on the CBT 112. Similarly, a bar code may be used to encode an identifier on a given element of marketing material. An optical scanner would then be used by the CBT 112 to read identification on such elements. When the marketing material is first read by the CBT 112, the user is given feedback if a proper identification is achieved.

The tags 112 then add their own unique ID and format a data packet to be sent to the Backscatter Reader Transponder(s) 114 and 116 (BRT). The data packet is encoded and reflected from the antenna 228 of the CBT 212 back to the BRT. Encoding can be as simple as creating and modulating a side band frequency (or subcarrier), such as 455 kHz. The actual data rate of the backscatter signal could be as low as 1 or 2 kbps since the amount of data is small and the requirements for reporting speed are modest. The backscatter signal may be modulated in (1) amplitude (AM), (2) frequency (FM), or (3) phase (PM). The CBTs 112 transmit their data, using such modulated backscatter techniques, to the BRTs 114/116 and from there to Hub 118 via antenna 120. The BRT 114 may operate in a half duplex mode with one antenna 115 while BRT 116 can operate in a full duplex mode using receiver antenna 117 and transmitting antenna 119. Hub 118 then transmits the received data out to a central server 16 as described in relation to FIG. 4.

In one embodiment, the readers are battery operated, and (like the tags) use sleep modes to conserve power. The Backscatter Reader Transponders 114 and 116 (in FIG. 11) may be battery powered and wake up on a periodic basis (e.g., once per hour) to receive signals from the tags 112. The BRTs 114/116 output a carrier wave in the 915 MHz Industrial, Scientific, and Medical (ISM) band. This band is from 902 MHz to 928 MHz. In order to comply with part 15 of the FCC rules, the BRT must hop between 25 or 50 channels in a pseudo-random fashion. The BRT stays on long enough to insure that the CBT has awakened and sent its modulated signal. The tag signal is modulated by the diode 226 of antenna 228 (see FIG. 12), which changes the impedance across the antenna 228. The CBT 212 reads the ID of the sign associated with it and stores that information into memory. The CBT 212 will then open or short the terminals of antenna 228 via the diode 226 in a well known fashion. When the terminals of antenna 228 are open, the antenna looks electrically like a 50 Ohm antenna and will absorb more of the continuous wave from the BRT than the shorted condition. In the shorted condition, the antenna 228 will reflect a portion of the wave back to the BRT receiver. As stated earlier, the data rate of switching the impedance creates a subcarrier (sideband) that is modulated by the data and reflected back to the BRT receiver for demodulation. The data rate generates the sideband equal to the serial data rate of shorting and opening the terminals of antenna 228. Using direct conversion in the receiver, the carrier will be eliminated leaving the sideband data available to be processed. The signal will be filtered and amplified for demodulation leaving only the base band information (i.e., tag data). Tags associated with a BRT system do not receive, interpret, or utilize the signal from the BRT, nor do they actually transmit energy to or receive energy from the BRT. Instead, such tags use backscatter modulation to transfer data to the BRT. In this way, cost and battery power associated with the tags are minimized, making commercialization of this system on a widespread basis more achievable. Tag simplicity and reliability are also maximized by this approach.

Multiple CBTs and/or BTs can be served by one BRT since they transfer data to the BRT at random time intervals. The ratio of tag transmit time to sleep time is very small. This data transfer may be accomplished without any coordination among the CBTs. The BRTs may generate a low battery signal indicating that a low battery condition is present.

Further, a signal is generated when the BRT 114/116 is moved or is subject to tampering. Software monitors the position of a switch 121 (shown on BRT 114 in FIG. 11) that is set when the BRT is mounted in a desired position or location. This switch 121 is very small and unobtrusive when the BRT reader 114 is installed at the retailer. If the reader 114 is moved in an unauthorized manner, software detects a change in the position of switch 121. The switch 121 may be a pressure operated switch or a position sensitive switch, such as a mercury switch, or other well known position sensitive switch. When the switch 121 indicates a change in position, the reader may detect a BT, CBT, or tag 10 which has been assigned to a specific person authorized to relocate or repair the reader. In the absence of such detection, the reader's movement can be interpreted as "unauthorized" or "tampering," and an appropriate signal can be transmitted to the central server 16.

Data about the read range associated with each BRT 114/116 (such as inches, a few feet, a dozen feet, many yards, and many dozens of yards) is transmitted in the packet of information back to the hub 118 so that the location of items can be identified within a desired subset of the total retail space available. This is accomplished by polling the position of a switch 122 (on BRT 116 in FIG. 11) that limits or extends its read range in a well known manner or by noting the amount of gain-control voltage supplied to the backscatter transmitter at the moment a tag is detected.

The BRT receiver 11 41116 has a finite sensitivity and will only detect a return signal (backscatter) that is at or above the minimum signal threshold. In one embodiment of the system, the output power of the transmitter is known and can be controlled by the BRT 114/116 microcontroller. Changing the output power level of the transmitter will therefore change the read distance.

The free space loss equation for radiated waves is:
Free Space Loss (dB)=20*log((4*Pi*F*D)/(c)) where:
Pi=3.14
F=frequency of wave
D distance in meters, and
c=speed of light (2.99×10$^8$ meters per second)

For purposes of illustration, assume radiated power from a backscatter transmitter (a combination of the conducted output power plus the gain of the antenna) is 100 mW or +20 dBm, a backscatter tag is located 20 meters from the backscatter system, backscatter reader receiver (BRT 114/116) has a sensitivity of −80 dBm, a backscatter received wave must travel 40 meters (20 to and from the tag), and since only a fraction of the transmitted wave gets rejected from the tag, a factor must be applied. For this example, assume 1% or 20 dB.

In this example, Loss (dB)=20*log((4*3.14*915E6*40)/ (2.99E8)). Thus, the Loss=63.7 dB. The received signal=transmitted power—free space loss—tag reflection factor=+20 dBm−63.7 dBm−20 dB=−63.7 dBm. A backscatter received signal of −63.7 dBm is 16.3 dB above the sensitivity of the receiver and would easily be detected.

A contrasting example is as follows. Assume the transmitter is now only radiating 1 mW or 0 dBm. In this case, the received signal=0 dBm −63.7 dB −20 dB=−83.7 dBm. In this example, the backscatter receiver would not detect the signal because it is below the minimum sensitivity level of −80 dBm. One can conclude from the above examples that a distance can be approximated by adjusting the output power of the backscatter transmitter.

For example, the BRT may automatically cycle through several pre-determined power settings and note the smallest setting in which a given identification is achieved. Combinations of detections, detection patterns, or the lack thereof across more than one BRT can also be used to locate CBTs in an environment once the read range and location of each BRT is known. The concept involves varying the power to an amplifier of the transmitted backscatter signal, noting the power status at which tags are detected, and attaching that status to the data packet sent back to the hub 118 from the backscatter reader 114/116. Thus, several power settings may be involved. At the lowest power setting (e.g., a 6 foot read range), several tags in the 6 foot range may be detected. The identification numbers of any tags read in that range would be reported to the hub 18 along with the identifier of the reader detecting them (two or more readers may detect the same tags since their coverage may be overlapping), as well as a code indicating that the reader had detected the tags at the lowest backscatter power setting. The reader 114/116 would then send a backscatter signal at a higher power setting and report all tags detected at that setting back to the hub 118 using FSK modulation, along with a code indicating the higher power backscatter setting.

When reader identification, tag identification, and power status data is received by a central server 16 from the hub 14 (see FIG. 4), the tags detected in the first transmission would be noted as proximal to a given reader, and the difference between the first set of tags detected and the second set detected is the set of tags that are more distant from that reader. This is automatically repeated at each of the power settings to allow ranges of tags proximity from each reader to be determined. In some instances, there may be two or more readers detecting a given tag. In these cases, location of tags can be determined even more precisely using a similar subtraction algorithm.

Alternatively, a single BRT could have a number of antennae connected to it in order to monitor a variety of locations or retail zones. An example of utilizing various read ranges could be three BRTs, each locating marketing materials in its own small separate area through a limited reception range (such as on specific gondolas) with two other BRTs identifying objects in a wide area (such as portions of the front end of a store). An identifiable overlap of reception/coverage can be obtained for additional location specificity. In addition to multiple antennae connected to a single BRT, repeater or relay stations could be established within a store to limit the number of BRTs required to cover key sections of the store or the entire store. Combinations of fixed short-range, portable (e.g., hand-held, robotic, mobile overhead, and/or cart) and wide-area BRTs using well-known signal relay apparatus and/or multiple antennae can be used to cover large format stores more economically.

It is also possible for providers of the marketing material to pre-package a backscatter tag 112 (having a unique identifier) on the material to be monitored. In such cases, backscatter technology is still used; however, to save cost, there may then be no need for the contact portion of the tag. This permits items to be monitored without any intervention of retail, audit, sales, or distribution personnel.

However, retail, sales, distribution, or audit personnel may indeed attach a tag to the item being monitored. Further, CBTs may be reusable, further reducing the cost of the system. Recovery of all tags 112 (FIG. 11) can be assisted by equipping the exit or the store room of retail establishments with a BRT/alarm system that will sound when a CBT passes through a doorway en route to the garbage bin or out of the store. CBTs will be small and unobtrusive when deployed.

Figure 12:
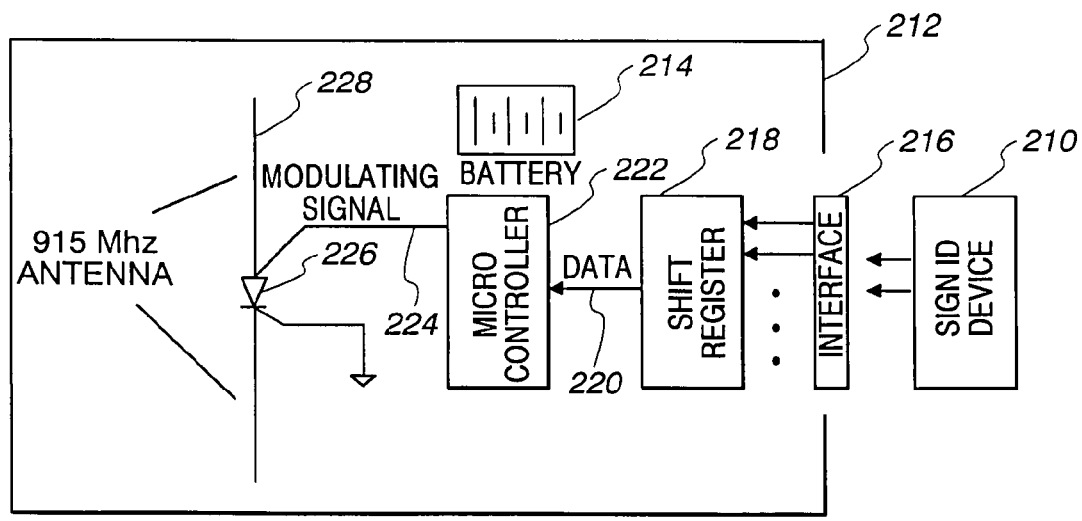
FIG. 12 shows a block diagram of a Contact Backscatter Tag.

The CBT tags 112 illustrated in FIG. 11 are shown schematically in FIG. 12 as a unit 212. As stated earlier, the tag 212 may scan the sign or advertisement ID device 210 in a number of ways including optical scanning, use of magnetic or conductive ink, notches, and the like to obtain a detected ID signal. The detected signals could be 16-24 bits of information and are passed through an interface 216 to shift register 218. Additional bits may be used for identification if very large numbers of marketing materials are to be identified. Further, the reading of the identification bits may be accomplished through a short extension cable 113 (see FIG. 11) attached between the CBT and the BRT 116. The extension would enable the BRT reader 116 to be out of sight of consumers. It would also enable small advertising elements or elements with a challenging position orientation to be monitored.

The BRTs 114/116 can be mounted in useful locations to communicate with one or more of the CBTs 212. For example, if it is desired to monitor a particular advertising element, or elements, in a particular location or area, such as, for instance, an aisle, or adjacent aisles, in a market, the BRT can be mounted in the ceiling just above the CBT 212. If either the BRT or one or more of the CBTs is moved any significant distance from its predetermined or fixed location, the BRT 114/116 no longer receives the data from the CBT, which allows the central server 16 to deduce that one or more CBTs has been moved.

Of course, the BRT 212 may be mounted in a fixed location horizontally from the CBT 212. Again, if the CBT 212 is moved a significant distance from its original location, no signal is received and the server reports the CBT as having been moved.

Alternatively, CBTs 212 could be used to monitor a featured price, with each of several digits associated with a displayed price reported as described earlier. The data would be shifted into a memory of the microcontroller 222 from shift register 218 on communication path 220. The sign ID, along with the tag 212 unique ID, is formatted and shifted out of the microcontroller 222 forming the modulating signal. This takes place on a periodic time basis, such as every 1 or 2 minutes. Battery 214 may be used to power the CBT 212, as shown in FIG. 12.

The system is robust and operates automatically. For example, a tag awakens on average each minute and sends modulating data. The data burst may take 10-12 milliseconds. The tag goes back to "sleep" for a random period of time, for example, 1 minute. Randomness may be simply the result of "sloppy" clocks in the CBTs. The BRT awakens every 60 minutes but remains on for 1 ½ minutes to insure all tags in range have had a chance to send their information. Through intermittent transmission, the likelihood that one reader will interfere with another is minimized. Similarly, intermittent tag data modulation lowers the likelihood that signals from multiple tags will collide or nullify each other.

The core component of the CBT is one of the very low-power, low-cost microcontrollers, such as the PIC series from Microchip. The battery in the CBT could be a small Lithium cell, like a hearing aid battery, or it could be a disposable type, such as an alkaline cell. The power is low enough that the CBT could be powered from a small photovoltaic cell that would produce energy from ambient light. This energy could charge a rechargeable battery, or simply be stored in a sufficiently large capacitor.

The BRT design is well understood, and can also be readily developed using available components. Key to it is a low-phase-noise oscillator and a power amplifier. This device must be capable of frequency hopping to comply with FCC requirements. RF Micro Devices makes several ICs that can be used to implement a phase-locked oscillator with the required properties. The frequency hopping can be accomplished using a code running on a small embedded processor, such as a PIC chip. Due to the vigorous developments in the wireless industry, there are many low-cost power amplifier components available, and, again, RF Micro Devices has several offerings in this area. Multiple signal processing options are possible, depending on the level of performance required. Almost all of the devices use a direct-conversion receiver, either single-channel or two quadrature channels (I/O processing). The data on the subcarrier (around 455 kHz) can be recovered using analog signal processing, digital signal processing, or even a mixture of the two. Data synchronization and recovery can be accomplished in software or programmable logic, or even by a custom IC.

Figure 15:
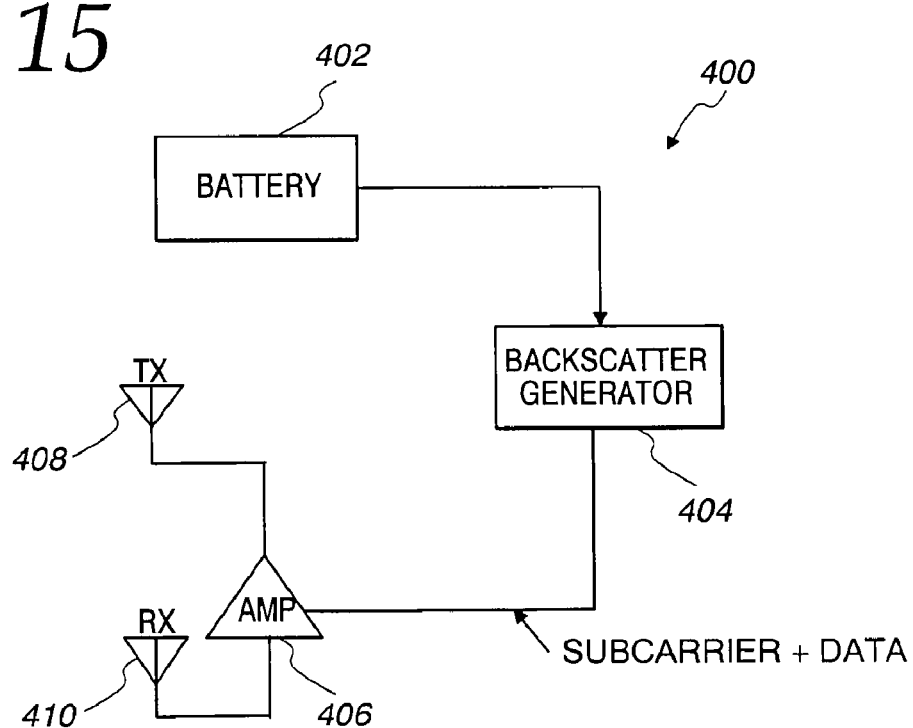
FIG. 15 shows a block diagram of a long range backscatter tag.

FIG. 15 shows one embodiment of a long range backscatter tag (LRBT) 400. As shown in this functional block diagram, the LRBT 400 includes a power source (such as battery 402), a backscatter generator 404, an amplifier 406, a transmitting antenna 408, and a receiving antenna 410. The LRBT 400 can transmit data over a longer range than typical backscatter tags because the LRBT 400 amplifies the received backscatter signal. The amplifier 406 is turned on and off by the subcarrier plus data signal from the backscatter generator 404. The LRBT 400 periodically wakes-up and sends out the amplified backscatter signal. If a reader 12 is within range and is transmitting a carrier wave, then the reader will receive tag data from the LRBT 400. This backscatter tag embodiment can greatly extend the data transmission range (e.g., double the range).

In one embodiment, the BRT 114/116 (shown in FIG. 11) uses a "patch" antenna (70-75 degree azimuth) for transmission/reception. This narrow range allows significant signal gain (6-8 dBi) versus an omni-directional antenna. Using a patch antenna allows tags to be detected at much greater distances from the reader. However, such reception distance comes at the expense of transmission width. In some cases, it is necessary to monitor areas that are both wide and deep. Rather than deploying multiple readers for this purpose, it is desirable to deploy one reader with multiple antennae.

Figure 16A:
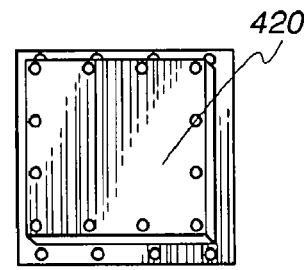
FIG. 16a shows one embodiment of a patch antenna.
Figure 16B:
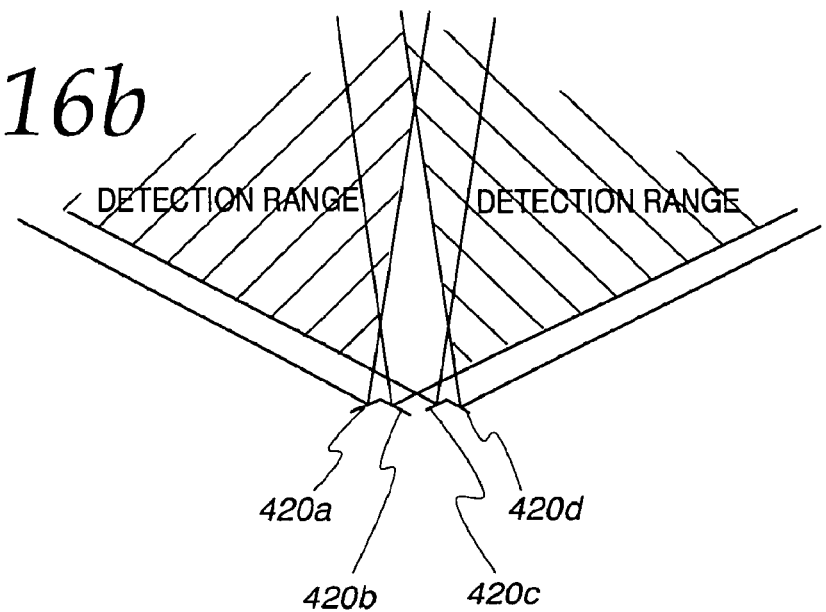
FIG. 16*b* shows two transmission patch antennae and two reception patch antennae in a generally "M" shaped arrangement.

FIG. 16a shows one embodiment of a patch antenna 420. This rectangular, generally flat antenna radiates energy from its flat surface in a narrow range. FIG. 16b shows one embodiment of a system including two transmission patch antennae 420a, 420b and two reception patch antennae 420c, 420d in a generally "M" shaped arrangement. This arrangement permits tags to be detected at significant distances (e.g., over 60 feet) and over a significant angular distance or azimuth (e.g., 130 degrees). This arrangement allows one reader to monitor a wide, deep area. For example, one reader (using this configuration) installed along the front wall of a store could monitor a large area in front of that wall. This configuration reduces the number of readers needed to monitor such a large area.

As shown in FIG. 16b, adjacent patch antennae (420a, 420b and 420c, 420d) are positioned at obtuse angles to each other. In one sequence, antenna 420a may transmit a backscatter signal, and antenna 420c will receive it. In a subsequent sequence, antenna 420b will transmit and antenna 420d will receive. The area not covered by this configuration directly in front of antennae 420b and 420c can be minimized at the expense of transmission width by making the angle between antennae 420a and 420b and/or 420c and 420d closer to 180 degrees.

Figure 16C:
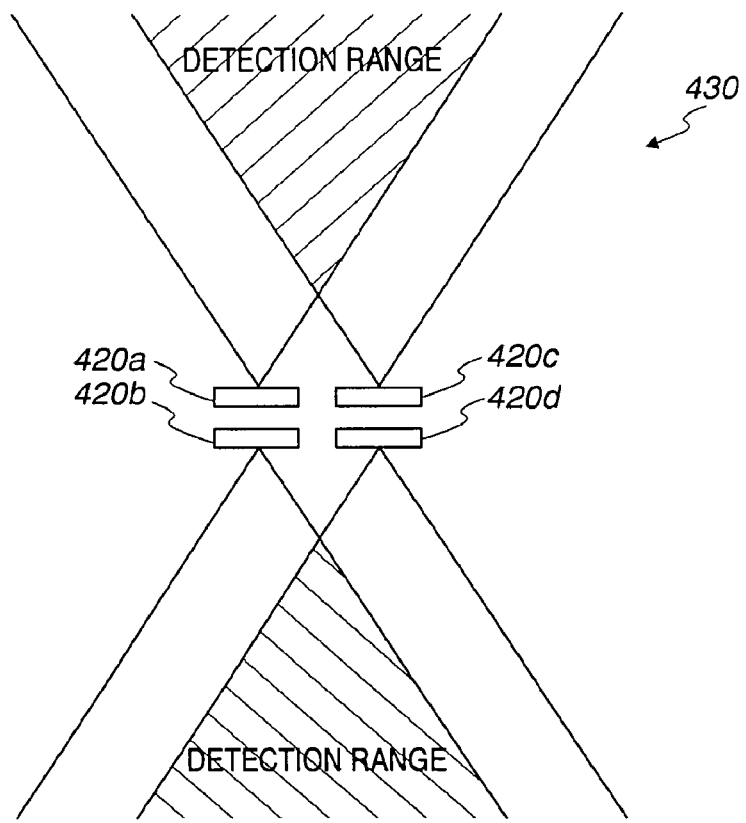
FIG. 16*c* shows two transmission patch antennae and two reception patch antennae in a back-to-back arrangement.
Figure 16D:
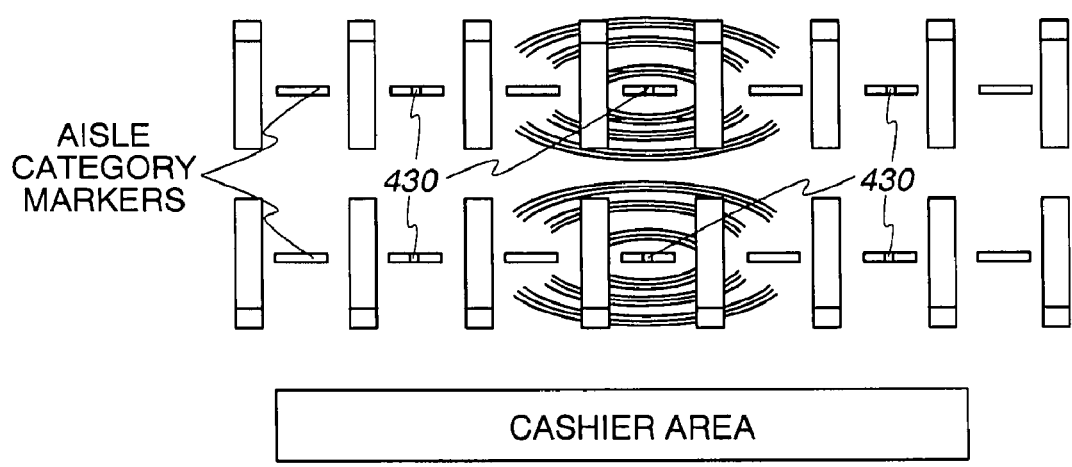
FIG. 16*d* shows a store having several aisles and an antennae arrangement disposed over an aisle.

FIG. 16c shows one embodiment of a system including two transmission patch antennae 420a, 420b and two reception patch antennae 420c, 420d in a back-to-back arrangement 430. This arrangement permits a reader connected to the four antennae to easily monitor, for example, one or more aisles of a store when the antennae arrangement 430 is disposed over an aisle, as shown in FIG. 16d.

Figure 16E:
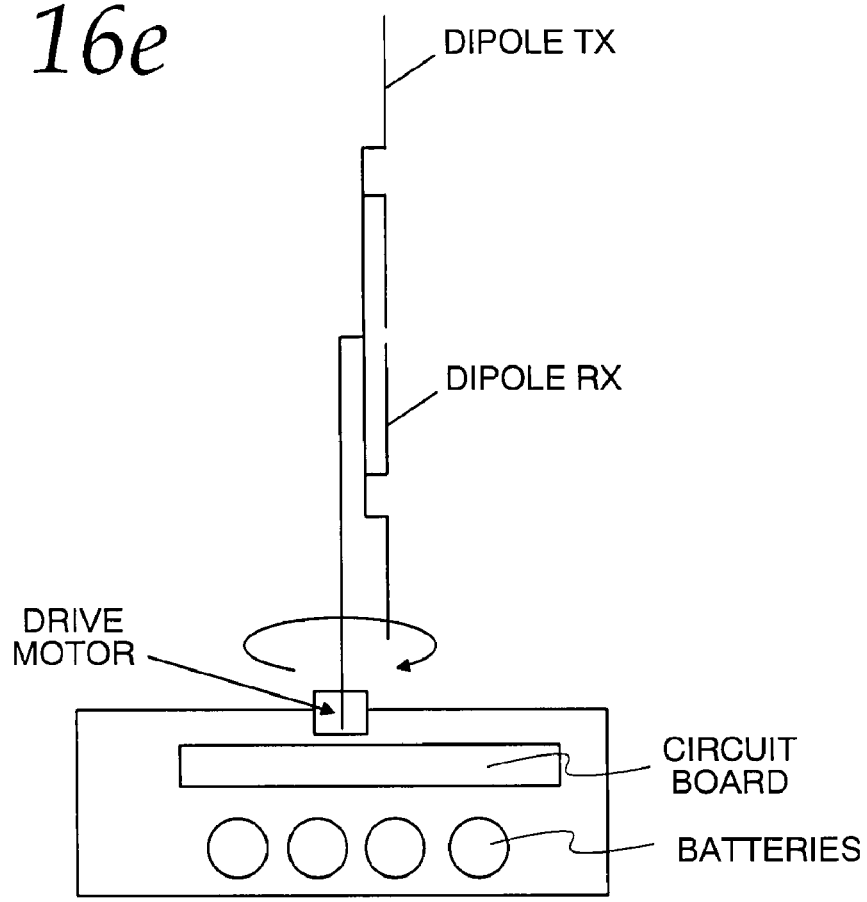
FIGS. 16*e* and 16*f* show side and top views, respectively, of one embodiment of a system including a transmit antenna and a receive antenna mounted for rotation about a fixed point.
Figure 16F:
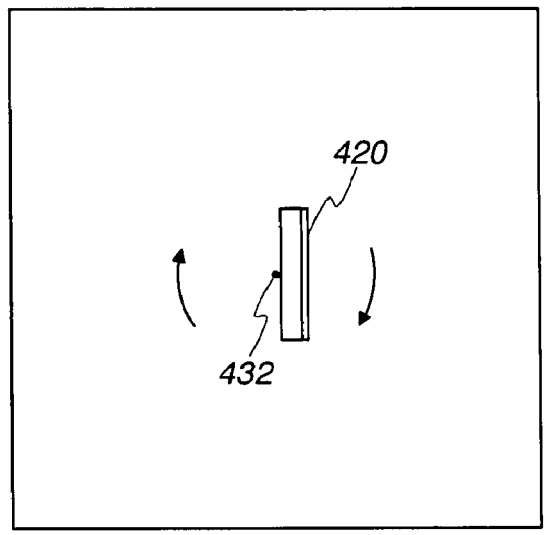

FIGS. 16e and 16f show side and top views, respectively, of one embodiment of a system including a transmit antenna 420a, a receive antenna 420c mounted for rotation about a fixed point 432. When rotated, the patch antennae sweep a prescribed arc (up to 360 degrees). In one embodiment, the antennae 420 are dipole antennae driven by a motor. Alternatively, the antennae can be a patch antennae, monopole antennae, or other suitable antennae. Antenna gain is maximized by narrowing the beam-width of an antenna. The rotating antennae permit a wide area to be monitored without loss of gain because a narrow beam is radiated, permitting tags to be detected at significant distances (e.g., over 60 feet), and this narrow bean rotated to cover a significant angular distance or azimuth (e.g., 180 degrees).

Figure 16G:
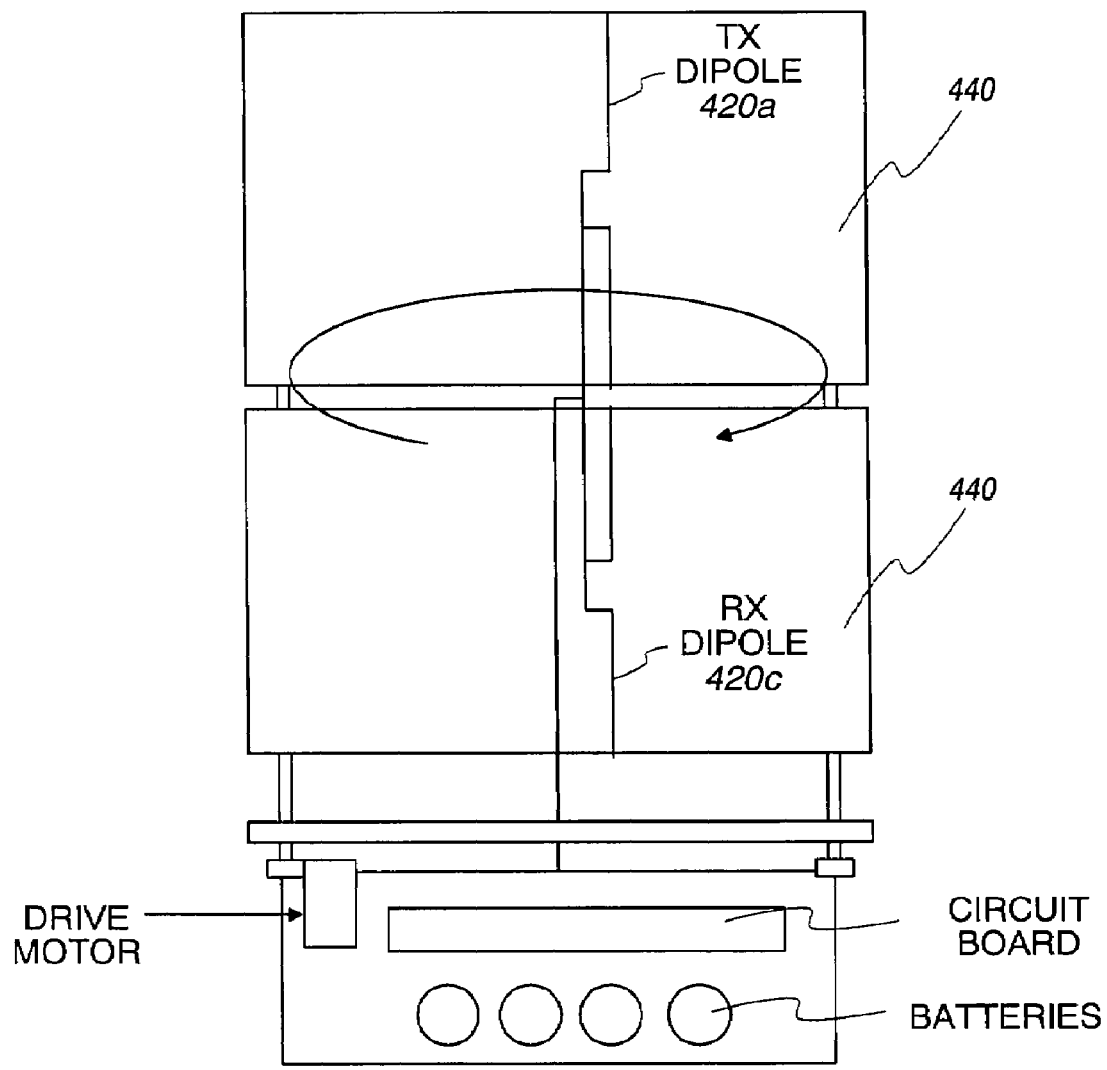
FIGS. 16*g* and 16*h* show side and top views, respectively, of an antenna arrangement including a transmit antenna, a receive antenna and a rotating reflector.
Figure 16H:
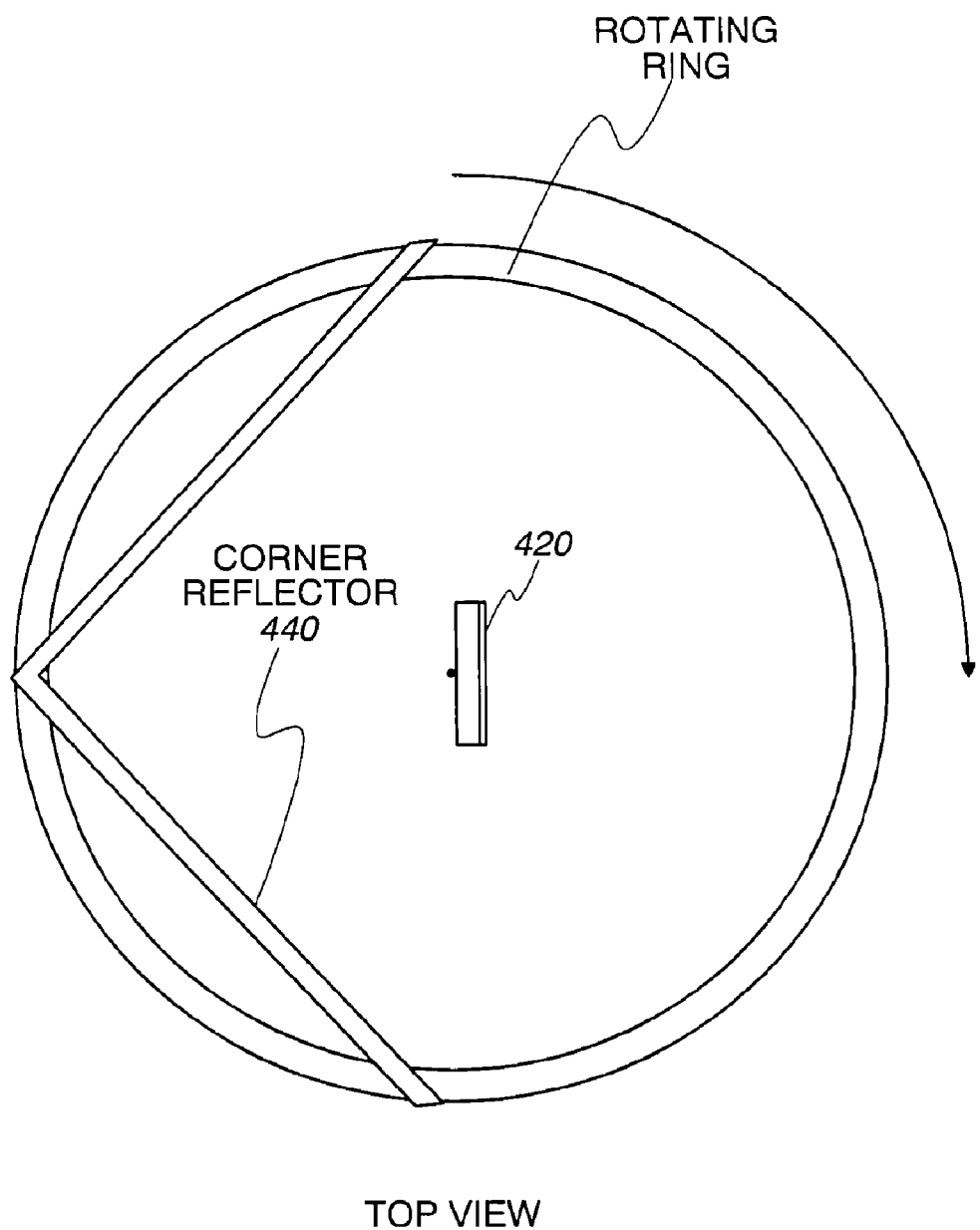

FIGS. 16g and 16h show side and top views, respectively, of one embodiment of a system including a transmit antenna 420a, a receive antenna 420c, and a rotating reflector 440. The reflector 440 revolves around the antennae to sweep a prescribed arc (up to 360 degrees). In one embodiment, the antennae 420 are dipole antennae, and the reflector 440 is a corner reflector disposed on a generally circular track driven by a motor. Alternatively, the antennae can be a patch antennae, monopole antennae, or other suitable antennae, and the reflector can have a spherical, parabolic, or other suitable shape. The reflector arrangement permits a wide area to be monitored without loss of gain because a narrow beam is radiated, permitting tags to be detected at significant distances (e.g., over 60 feet), and this narrow bean is reflected to cover a significant angular distance or azimuth (e.g., 180 degrees).

Product Monitoring System

The system described herein can also be used to cheaply monitor the presence, absence, and near-absence of a product being displaying in a store. In one embodiment, the system can monitor products without those products having an RFID tag affixed thereto. Such an embodiment increases the speed at which product monitoring can be implementing, while minimizing the costs associated with the monitoring system.

Figure 17:
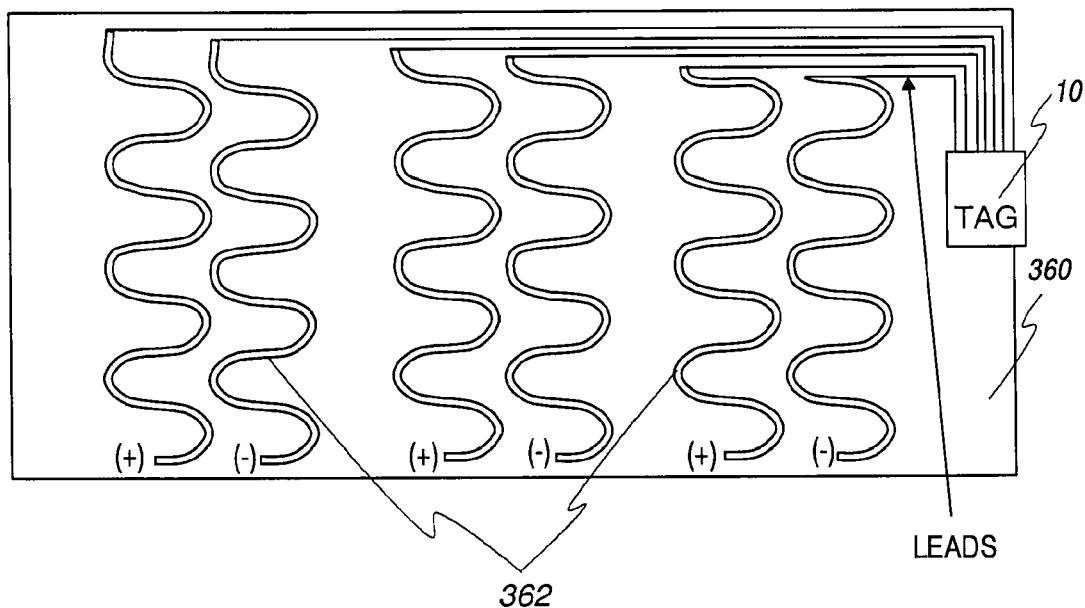
FIG. 17 shows a top view of a shelf including a product monitoring system.

FIG. 17 shows one embodiment of a product monitoring system. As shown in this top view, several pairs of wavy lines 362 are disposed on the horizontal surface of a shelf 360 on which the products to be monitored sit. The wavy lines 362 include conductive ink. As used herein, the term "conductive ink" comprises any conductor or material having conductive properties, including foil, paper or plastic, which is disposed on the shelf 360. Methods of applying the conductive lines 362 to the shelf include printing, stamping, embossing, engraving, laminating, adhering, taping, gluing, or other suitable methods. The lines 362 can be applied to the shelf when made or thereafter. Preferably, the lines 362 are wavy to ensure that a broad array of product configurations is accurately monitored, particularly as the shelf nears an empty state. The wavy lines 362 are disposed on the shelf in pairs, each pair having a positive conductor and a negative conductor. Each of the wavy lines 362 conducts a low wattage DC current and creates a circuit that is closed by contact with conductive ink located on the bottom of each product being monitored, as shown in FIG. 18.

Figure 18:
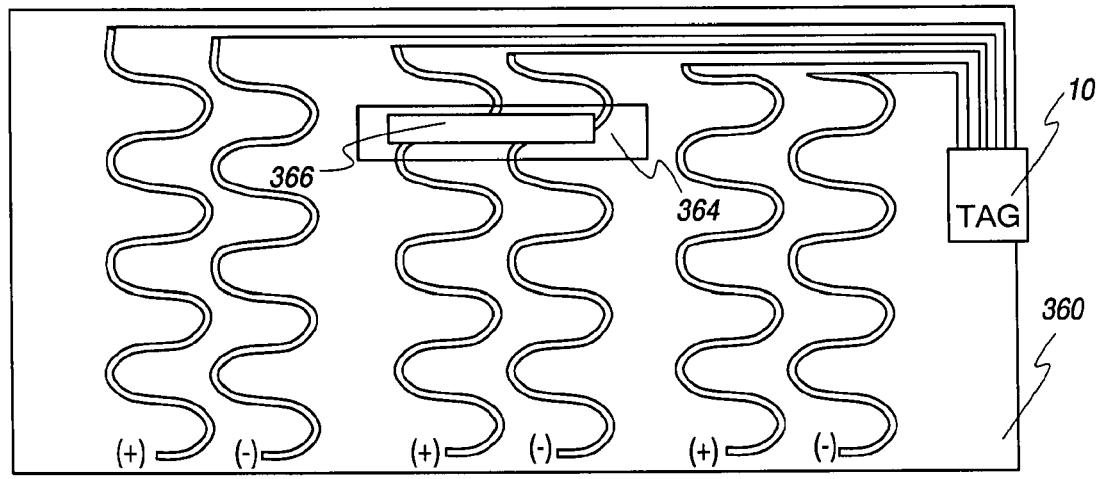
FIG. 18 shows a top view of a product monitoring system including conductive ink disposed on a shelf and on the bottom of a product being monitored.

In the embodiment illustrated in FIG. 18, the bottom of the monitored product 364 includes a strip of conductive ink 366. This strip is long enough to short the adjacent wavy lines having opposite polarity. This short closes the circuit and indicates the presence of the product. In one embodiment, each pair of conductors on the shelf are 1" apart. The conductive ink on the bottom of each product can be applied when the packaging (e.g., box) is made or thereafter. The conductive ink can be applied to the packaging via printing, stamping, embossing, engraving, laminating, adhering, taping, gluing, or other suitable methods. Naturally-conductive products, such as aluminum or tin cans, do not need conductive ink to be monitored by the system. In one embodiment, the shelf is made of metal, cardboard, plastic or other suitable material. In embodiments having a metal shelf, an insulator should be disposed between the shelf and the conductive ink.

A tag 10 monitors the resistance across each pair of the conductive lines 362 to determine the presence or absence of products. If the resistance measured across a pair of conductors is large (e.g., an open circuit), that portion of the shelf is empty or nearly empty. If the resistance is small, that portion of the shelf is occupied by products that include conductive ink. When products are removed, the resistance increases, causing a voltage change that is stored in the tag. By using several pairs of conductive lines, the system can monitor several sections of the shelf 360. By monitoring the voltage between each pair of conductors, the system can report three different conditions for each monitored section of the shelf: in stock, low stock, and out of stock. Furthermore, most displays include several shelves, each of which can be monitored by the system, as shown in FIG. 19.

Figure 19:
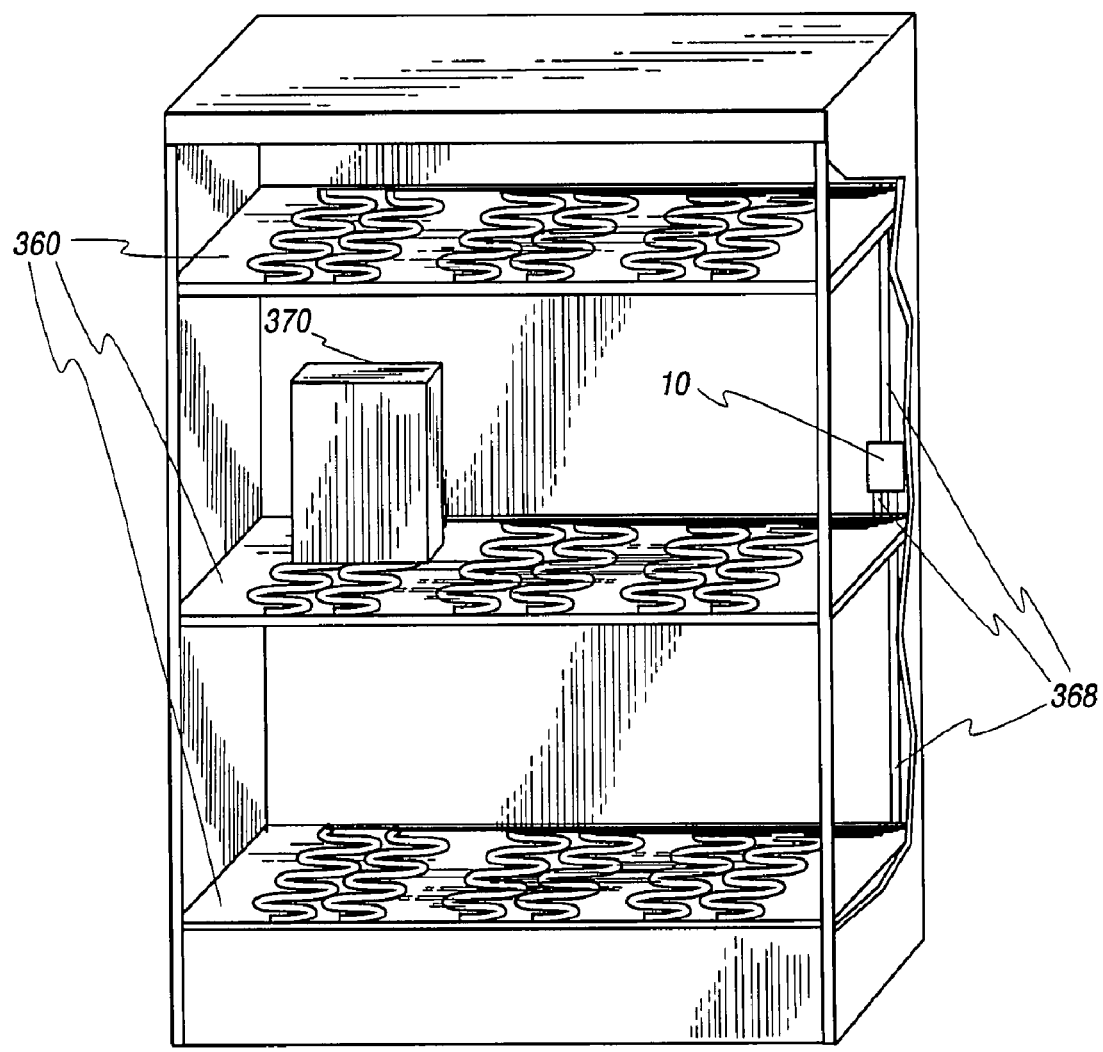
FIG. 19 shows a perspective view of a product monitoring system including a display having three shelves each including areas of conductive ink.

In the embodiment illustrated in FIG. 19, the display includes three shelves 360, each including areas of conductive ink. Leads 368 connect the conductors on the three shelves to one tag 10, which periodically sends tag data to a reader 12, as described above. The conductive lines 362 on the shelves can be oriented orthogonal to the front of the shelves (to monitor and report the estimated number of products in a column on the shelf) or parallel to the front of the shelves to minimize the number of conductors. The conductors 362 on the shelves can detect either individual products (e.g., single boxes) or multiple products packaged together.

The incremental cost of making products in compliance with the product monitoring system is very small (e.g., less than a penny per product). Likewise, the cost of making a display in compliance with the product monitoring system is reasonable (e.g., less than $5 per display).

In one embodiment, low stock and out of stock conditions are determined by the central server 16. When one of many circuits on a given shelf is reported as "open" (empty state), a low stock condition may exist. As other circuits on the same shelf report an open circuit, the server can determine that the shelf is emptying. When all circuits on a display are open, an out-of-stock condition exists. Until the display is restocked with products having conductive ink, the display will be reported as being out of compliance with the marketing program.

The tag 10 may comprise an active tag, backscatter tag or CBT. The reader 12 may comprise a BRT. Moreover, the tag 10 may send data to the reader 12 or directly to the hub 14.

Figure 20:
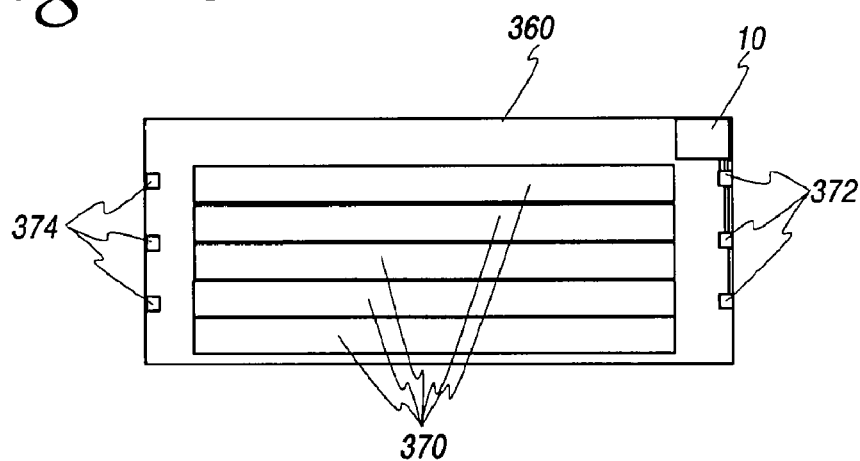
FIG. 20 shows an embodiment of a product monitoring system including optical sensors.

FIG. 20 shows another embodiment of a product monitoring system. As shown in this top view, optical transmitters 372 are disposed on one side of the shelf 360, while optical receivers/reflectors 374 are disposed on the opposite side. These optical sensors monitor the presence of products on the shelf. By using multiple sensors, the system can monitor the amount of products on the shelf. In one embodiment, the optical transmitters 372 and receivers 374 are binary light-beam sensing devices disposed on opposite sides of a column of products. If multiple columns of products are displayed on one shelf, then pairs of optical transmitters 372 and receivers 374 should be disposed on opposite sides of each column. In this way, the optical sensors can monitor the presence or absence of the products in each column. In the illustrated embodiment, a small, re-usable strip of lights is placed on the right side of the shelf, and a corresponding strip of small photoelectric cells is placed on the opposite side of the shelf. The lights pulse periodically (e.g., every 3 hours) in succession; thus, the presence of a product would interrupt the light beam(s), causing one or more sensors to produce a signal corresponding to a non-empty state. Leads connect the sensors to the tag 10. As multiple sensors on the shelf 360 detect their corresponding lights, empty or near-empty states are reported to the tag 10, which periodically sends tag data to a reader 12, as described above. In one embodiment, the system can report three different conditions: in stock, low stock, and out of stock.

Figure 21:
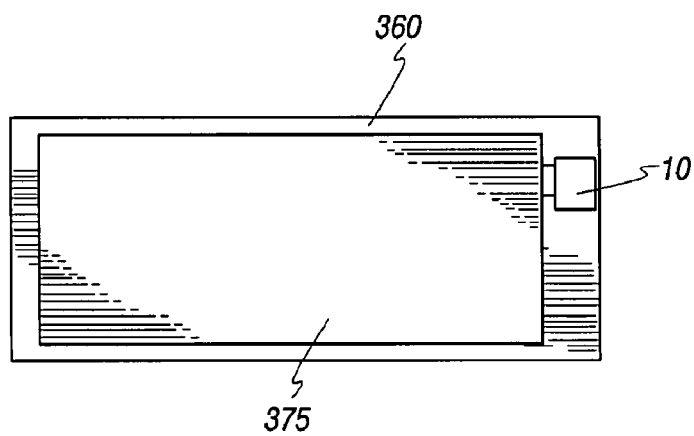
FIG. 21 shows an embodiment of a product monitoring system including a weight sensor.

FIG. 21 shows a further embodiment of a product monitoring system. As shown in this top view, a weight sensor 375 is disposed on the shelf 360. There are numerous devices that can detect weight or changes in weight and report that information as a voltage. The weight sensor 375 may comprise two-position micro switches, a continuously-variable weight sensor, or other suitable weight sensor. In one embodiment, micro switches could be sandwiched between layers of cardboard, closing an electric circuit when an empty condition occurs (or when tension on the switch is less than a predetermined amount). In another embodiment, a continuously-variable weight sensor could be embedded in a mat on which products are placed. The weight sensor 375 measures the weight of the products disposed thereon. Thus, the sensor 375 can be used to monitor the presence of products on the shelf. By knowing the weight of each product, the system can monitor the amount of products on the shelf. A lead connects the weight sensor 375 to the tag 10, which periodically sends tag data to a reader 12, as described above. In one embodiment, the system can report three different conditions: in stock, low stock, and out of stock.

Figure 22:
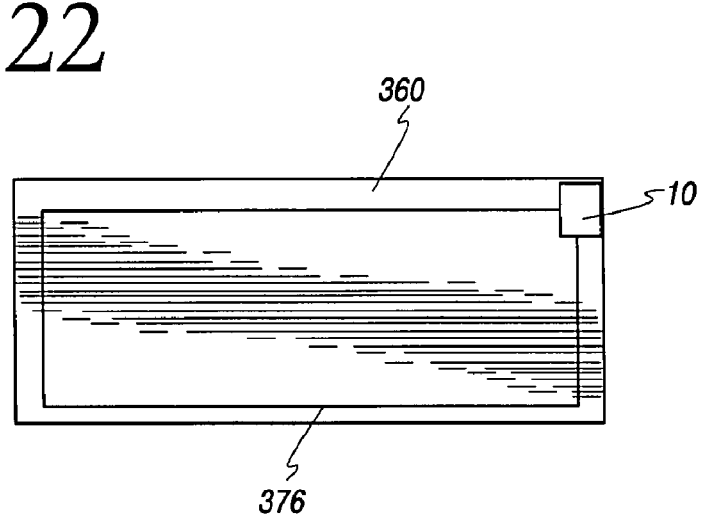
FIG. 22 shows an embodiment of a product monitoring system including an inductance sensor.

FIG. 22 shows another embodiment of a product monitoring system. As shown in this top view, a conductor 376 is disposed near the periphery of the shelf 360, forming a loop. The tag 10 is connected to the conductor 376. A conductive loop can be "tuned" for a given mass/volume of matter in its immediate vicinity. An inductance sensor (preferably included in the tag 10) can detect and report small inductance changes. In one embodiment, the tag 10 senses the inductance of the loop and stores the inductance value. When products are placed on or removed from the shelf, the inductance changes. The tag 10 senses the inductance change and stores the new inductance value. Thus, the inductance can be used to monitor the presence and amount of products on the shelf. The tag 10 periodically sends tag data to a reader 12, as described above. In one embodiment, the shelf is made of metal, cardboard, plastic or other suitable material. The conductor may comprise a wire embedded in or attached to the shelf 360. In embodiments having a metal shelf, an insulator should be disposed between the shelf and the conductor 376. In one embodiment, the system can report three different conditions: in stock, low stock, and out of stock.

In one embodiment, the system described herein can be used to monitor the presence and location of shelf labels in a store. Passive or contact tags could be embedded in or attached to shelf labels to allow monitoring of shelf layout. One reader having multiple antennae could be used to report data associated with a particular shelf or display.

In another embodiment, the system can be used to monitor when marketing materials and signs are received in stores. A reader in the receiving area could monitor tags associated with the marketing materials, signs or packaging materials used to ship the marketing materials and/or signs.

Reader Calibration

When setting-up RFID systems, especially those with long read ranges and/or power agility, it is often necessary to perform calibration of the read-range performance and other parameters of the installed system. In some backscatter systems, a reader having special software is connected to a computer that commands and monitors the calibration process. A normal tag is placed at the desired reading distance and, using the reader and computer, read statistics, signal levels, etc. are verified.

The system described herein uses a different approach that has several advantages over the known approach. Special tags, called calibration tags, are used to perform the calibration. Calibration tags are assigned unique IDs and the readers are programmed to recognize these IDs. When a reader recognizes a calibration tag, it automatically goes into the appropriate calibration routine. Preferably, this is done without any external device (e.g., a computer or PDA) connected to the reader. The reader completes the required calibration and stores the results and/or sends them to the hub and/or central server via the normal reporting method used by the reader (e.g., modem, LAN, etc.).

For example, suppose a reader can detect tags in three different read zones: 0-5 meters, 5-10 meters, and >10 meters. Three different calibration tags would be used for calibrating the reader to the three zones. A technician doing the initial installation or a recalibration would bring three calibration tags to the job site. A 0-5 m calibration tag would be set up at a distance of 5 m from the reader and then activated. The reader would initiate an automatic calibration process with the tag wherein the reader adjusts its output power and records read statistics. After the reader has determined the minimum power required to read the tag at 5 m, it will produce an indication signal (e.g., a beep). The technician would then turn off the "5 m" calibration tag, place a "10 m" tag at a distance of 10 m from the reader, and activate the tag. This procedure is repeated until all the read zones are calibrated.

The advantages of this approach are: 1) no computer or PDA needs to be carried by the technician; 2) no connection needs to be made to the reader, which is especially advantageous if the reader is concealed or is in an inaccessible location; 3) low cost; and 4) simple and quick calibration of the system.

In one embodiment, the readers and tags include a location feature that allows technicians to easily locate concealed readers and tags. A hand-held reader or PDA can be used to send a location command that instructs tags and readers within range of the transmitter to provide an indication signal (e.g., a beep). This would speed-up service calls since the technician would not have to rely on written documentation to locate all readers and tags at a site.

In one embodiment, data from the readers is transferred to "traveler tags" that are carried by service technicians. This would allow the service technician to download tag and reader data including system performance information, temperature extremes, transmission levels, read statistics, etc. This is especially advantageous where a site would not want to pay to send such data to the hub and/or central server via the normal reporting method used by the reader (e.g., dial-up modem, fax, ISP, etc.).

In one embodiment, special function tags are used to send commands to readers and/or tags. These commands may include selecting between different operational modes, changing sleep/wakeup cycles, setting the number of transmissions at a specified frequency, selecting which frequency band to use, etc. Almost any command that can be sent over a serial interface can be communicated using a special tag. These special tags transmit tag data including tag ID number and type. The type of tag field is used to communicate commands to readers and/or other tags.

Although generally no two RFID tags have the same ID number, it is permissible for all tags with the same function to have the same ID number. For example, all "5 m" tags can have the same ID number. The type of tag field identifies the type of tag, (e.g., calibration tag, special function tag).

EXAMPLE

A prototype version of the Backscatter Reader Transponder (BRT) and test tag has been operated. A test tag was programmed using a complex programmable logic device (CPLD) from Xilinx Inc., Device No. XCR3128XL-6-VQ100, to produce the actual signals that would be used in a production version of the Backscatter Tag (BT) or Contact Backscatter Tag (CBT). A test tag was made from a BRT board using only the necessary components (CPLD, voltage regulator, clock, decoupling capacitors, etc.) to simulate a BT. The test BT was programmed to backscatter a data block every 306 ms. In normal operation, the tag would transmit data about once per hour. The CPLD (Complex Programmable Logic Device) on the Backscatter Reader contains dedicated circuitry to demodulate the received signal and present the data as successive bytes transferred to the microcontroller. The inputs were a modulated subcarrier at 455 kHz and a 10 MHz clock.

A 24-bit accumulator was used to create a programmable digital oscillator driven by the 10 MHz clock, which will overflow near the 455 kHz subcarrier frequency. The modulated subcarrier is compared to the phase and frequency of the locally generated subcarrier frequency. The modulus of the accumulator is reduced if the local frequency is greater than the received subcarrier, the modulus is increased if the local frequency is less than the received signal, and a clock at four times the subcarrier frequency is generated and presented to the successive processes. The subcarrier is then stripped from the raw-input signal by applying an exclusive OR function to the raw data and the recovered subcarrier clock. An integrate and dump filter was implemented using a 10-bit up-counter to remove tracking errors and sampling errors near the transitions and for optimal demodulation. The data stream was sampled 256 times per bit period and a binary decision was made at the end of the bit period based on the total integrated energy in the bit time. Bit boundaries are determined by detecting the phase change in the received subcarrier when the data changes, and by flywheeling through periods of no data transitions with a counter. Since the data is differentially encoded prior to transmission, a differential decoder is provided after the integrate and dump filter. Differential coding insures that no polarity ambiguity exists in the recovered data.

The serial data stream was input to an eight-bit shift register to provide a byte-wide interface to the microprocessor. An eight-bit sync byte is detected by a magnitude compare circuit, and the next byte in the data stream is loaded into a register which counts the bytes transferred in the data packet. As each byte of the packet is aligned in the shift register, a write pulse is generated which latches that byte in the microprocessor input port and signals the microprocessor. After all bytes of the data packet have been transferred, the circuitry is reinitialized and ready for receipt of the next packet. The BRT was hopping through the 51 channels in pseudorandom order. The radiated power was approximately 0.5 W (+19 dBm +8 dBi=+27 dBm). The detected packets were output from the BRT to a PC running a terminal program. The terminal program displayed the number of good packets received and the number of packets that spoofed a Fletcher checksum algorithm.

During preliminary testing, at a range of 25-35 feet, there was nearly 100% data package reception from the tag, with any loss being attributable to time delay in channel hopping, the data loss being picked up at the next transmission. At a 65 foot distance between the tag and BRT, the rate of successful packet receipt was 50% and the rate of packets that spoof the Fletcher checksum was approximately 0.01%.

In a commercial device, a lithium battery, such as a CR2032, could be used. The tag may use a Microchip PIC, such as No. C-672, or a CPLD, from Xilinx, Inc. A suitable switch decoder by Alpha or Hewlett Packard would be used to switch impedance.

Thus, the system described herein can monitor the presence and location of signs and report displayed prices to determine compliance with an advertising or marketing program. In one embodiment, the system uses RFID tags and RF links to communicate tag data to a computer that can generate an alert to inform one of more individuals of an event (e.g., non-compliance with a program). Moreover, the system can monitor the presence and amount of products in stock. In addition, the system can monitor consumer exposure to specific products and signs.

While particular embodiments of the invention have been shown and described in detail, it will be obvious to those skilled in the art that changes and modifications of the present invention, in its various embodiments, may be made without departing from the spirit and scope of the invention. Other elements, steps, methods and techniques that are insubstantially different from those described herein are also within the scope of the invention. Thus, the scope of the invention should not be limited by the particular embodiments described herein but should be defined by the appended claims and equivalents thereof.

The invention claimed is:

1. A system for monitoring compliance with an advertising program comprising:
   backscatter means for sending data associated with a sign placed in a location in accordance with a specific advertising program;
   receiving means for receiving the sign data; and analyzing means for communicating with the receiving means and for analyzing the sign data to determine whether the sign is in compliance with the specific advertising program.

2. The system of claim 1, wherein the sign includes a displayed price, and further comprising:
means for monitoring the displayed price;
means for sending the displayed price to the analyzing means; and
means for determining whether the displayed price is in compliance with the specific advertising program.

3. The system of claim 1, further comprising means for determining the number of consumers that pass within a given distance from the sign.

4. The system of claim 1, further comprising:
means associated with the sign for identifying the sign; and
means for determining whether the sign is in the location required by the specific advertising program.

5. The system of claim 1, wherein:
the backscatter means is a contact tag;
the receiving means is a backscatter reader; and
the analyzing means is a computer.

6. A system for monitoring consumer exposure to specific advertising comprising:
advertising means located in a store;
backscatter means carried by a consumer;
receiving means disposed adjacent the advertising means for receiving data from the backscatter means; and
analyzing means for communicating with the receiving means and for determining how many consumers pass within a predetermined distance from the receiving means.

7. The system of claim 6, wherein:
the backscatter means is a consumer carried card having a backscatter tag therein;
the receiving means is a backscatter reader; and
the analyzing means is a computer.

8. The system of claim 6, wherein the backscatter means includes personal identification information about the consumer.

9. A system for monitoring products on a shelf comprising:
a product sensor that detects whether a product is present on the shelf;
an RFID tag associated with at least one shelf, the tag storing tag data corresponding to whether a product is present on the shelf;
a reader that receives the tag data from the tag; and
a computer that receives the tag data and determines whether the shelf is empty.

10. The system of claim 9, wherein the product sensor includes conductors formed by conductive ink.

11. The system of claim 9, wherein the product sensor includes optical sensors.

12. The system of claim 9, wherein the product sensor includes a weight sensor.

13. The system of claim 9, wherein the product sensor includes an inductance sensor.

14. The system of claim 9, wherein the product sensor is connected to the RFID lag.

15. A system for monitoring products comprising:
an RFID tag associated with at least one shelg, the at least one shelf including conductors formed by conductive ink; and
a product including conductive ink that makes an electrical connection between at least two of the conductors to form a closed circuit.

16. The system of claim 15, wherein the tag detects the resistance across at least two of the conductors.

17. The system of claim 15, wherein the resistance indicates the presence of the product.

18. The system of claim 15, further including a reader that receives tag data from the tag.

19. A method of calibrating an RFID tag reader comprising:
locating a calibration tag a specified distance from the reader;
initiating an automatic calibration process wherein the reader adjusts its output power and determines whether it can detect the calibration tag; and
determining the minimum output power required to detect the tag at the specified distance.

20. The method of claim 19, further comprising:
locating the calibration tag a second specified distance from the reader;
initiating an automatic calibration process wherein the reader adjusts its output power and determines whether it can detect the calibration tag; and
determining the minimum output power required to detect the tag at the second specified distance.

21. The method of claim 19, further comprising producing an indication signal when the automatic calibration process is complete for the specified distance.

* * * * *

UNITED STATES PATENT AND TRADEMARK OFFICE
CERTIFICATE OF CORRECTION

PATENT NO. : 7,549,579 B2  
APPLICATION NO. : 12/110516  
DATED : June 23, 2009  
INVENTOR(S) : Overhultz et al.

Page 1 of 1

It is certified that error appears in the above-identified patent and that said Letters Patent is hereby corrected as shown below:

In column 32, line 12, delete "lag" and insert -- tag --.

In column 32, line 14, delete "shelg" and insert -- shelf, --.

Signed and Sealed this

Twenty-eighth Day of July, 2009

JOHN DOLL  
*Acting Director of the United States Patent and Trademark Office*